(12) United States Patent
Edwards et al.

(10) Patent No.: US 11,507,494 B2
(45) Date of Patent: *Nov. 22, 2022

(54) METHOD OF, AND APPARATUS FOR, TESTING COMPUTER HARDWARE AND SOFTWARE

(71) Applicant: Eggplant Limited, London (GB)

(72) Inventors: Antony Edwards, London (GB); Giles Thomas Hall, London (GB)

(73) Assignee: EGGPLANT LIMITED, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/082,786

(22) Filed: Oct. 28, 2020

(65) Prior Publication Data

US 2021/0042213 A1 Feb. 11, 2021

Related U.S. Application Data

(63) Continuation of application No. 15/429,387, filed on Feb. 10, 2017, now Pat. No. 10,853,226.

(30) Foreign Application Priority Data

Feb. 10, 2016 (GB) ..................................... 1602423

(51) Int. Cl.
 *G06F 11/36* (2006.01)
 *G06F 11/22* (2006.01)
(52) U.S. Cl.
 CPC ...... *G06F 11/3664* (2013.01); *G06F 11/2247* (2013.01); *G06F 11/3608* (2013.01); *G06F 11/3684* (2013.01)
(58) Field of Classification Search
 CPC .................................................. G06F 11/3664
 See application file for complete search history.

(56) References Cited

U.S. PATENT DOCUMENTS 4,116,444 A 9/1978 Mayer et al.
4,791,476 A 12/1988 Chauvel
(Continued)

FOREIGN PATENT DOCUMENTS

WO 9411818 5/1994
WO 0954820 10/1999
(Continued)

OTHER PUBLICATIONS

Combined Search and Examination Report dated Apr. 4, 2016, for British Application No. GB1602423.4 (6 Pages).
(Continued)

*Primary Examiner* — Jae U Jeon

(57) ABSTRACT

There is provided a method for defining an automated test configured, when executed, to test a system under test comprising one or more computer programs being executed on one or more computer devices. The system under test comprises a plurality of operational states, at least one operational state having one or more executable actions associated therewith operable to execute predetermined operations and/or transition the system under test between operational states. The method comprises the steps of: a) defining an executable model of the system under test comprising a plurality of model states, wherein at least some of the model states are representative of operational states of the system under test; and b) defining one or more selectable model actions, each model action being representative of one or more executable actions on the system under test and configured such that one or more preconditions are assignable thereto, wherein each model action is configured to be available to be selected unless any preconditions assigned to the respective model action are not satisfied, wherein the model is configured such that, when executed, a test pro-
(Continued)

gram is operable to select a sequence of available model actions to define an automated test.

18 Claims, 9 Drawing Sheets

(56) References Cited

U.S. PATENT DOCUMENTS

| | | | |
|---|---|---|---|
| 4,949,248 A | 8/1990 | Caro et al. | |
| 5,022,028 A | 6/1991 | Edmonds et al. | |
| 5,066,902 A | 11/1991 | Watanabe | |
| 5,130,936 A | 7/1992 | Sheppard et al. | |
| 5,134,697 A | 7/1992 | Scheffler et al. | |
| 5,157,782 A | 10/1992 | Tuttle et al. | |
| 5,241,625 A | 8/1993 | Epard et al. | |
| 5,249,270 A | 9/1993 | Stewart et al. | |
| 5,321,838 A | 6/1994 | Hensley et al. | |
| 5,325,377 A | 6/1994 | Tuttle | |
| 5,333,302 A | 7/1994 | Hensley et al. | |
| 5,335,342 A | 8/1994 | Pope et al. | |
| 5,343,409 A | 8/1994 | Satterfield et al. | |
| 5,371,883 A | 12/1994 | Gross et al. | |
| 5,475,843 A | 12/1995 | Halviatti et al. | |
| 5,499,108 A | 3/1996 | Cotte et al. | |
| 5,572,444 A | 11/1996 | Lentz et al. | |
| 5,591,956 A | 1/1997 | Longacre et al. | |
| 5,594,892 A | 1/1997 | Bonne et al. | |
| 5,598,521 A | 1/1997 | Kilgore et al. | |
| 5,600,789 A | 2/1997 | Parker et al. | |
| 5,604,509 A | 2/1997 | Moore et al. | |
| 5,634,002 A | 5/1997 | Polk et al. | |
| 5,637,851 A | 6/1997 | Swartz et al. | |
| 5,646,602 A | 7/1997 | Gertz et al. | |
| 5,669,000 A | 9/1997 | Jessen et al. | |
| 5,675,141 A | 10/1997 | Kukihara et al. | |
| 5,699,263 A | 12/1997 | Nakao | |
| 5,732,212 A | 3/1998 | Perholtz et al. | |
| 5,739,809 A | 4/1998 | McLaughlin et al. | |
| 5,778,230 A | 7/1998 | Wimble et al. | |
| 5,781,720 A | 7/1998 | Parker et al. | |
| 5,790,977 A | 8/1998 | Ezekie | |
| 5,796,566 A | 8/1998 | Sharma et al. | |
| 5,805,442 A | 9/1998 | Crater et al. | |
| 5,816,820 A | 10/1998 | Heinz et al. | |
| 5,826,239 A | 10/1998 | Du et al. | |
| 5,831,639 A | 11/1998 | Conticello et al. | |
| 5,848,427 A | 12/1998 | Hyodo et al. | |
| 5,874,966 A | 2/1999 | Polimeni et al. | |
| 5,881,230 A | 3/1999 | Christensen et al. | |
| 5,889,994 A | 3/1999 | Brown et al. | |
| 5,898,419 A | 4/1999 | Liu | |
| 5,926,638 A | 7/1999 | Inoue | |
| 5,982,392 A | 11/1999 | Anfossi et al. | |
| 5,990,852 A | 11/1999 | Szamrej et al. | |
| 5,995,663 A | 11/1999 | Itsuzaki et al. | |
| 6,002,871 A | 12/1999 | Duggan et al. | |
| 6,005,964 A | 12/1999 | Reid et al. | |
| 6,011,830 A * | 1/2000 | Sasin | H04W 24/00 455/423 |
| 6,014,125 A | 1/2000 | Herbert | |
| 6,023,580 A | 2/2000 | Sifter | |
| 6,026,236 A | 2/2000 | Fortin et al. | |
| 6,037,926 A | 3/2000 | Haas et al. | |
| 6,046,740 A | 4/2000 | LaRoche et al. | |
| 6,067,638 A | 5/2000 | Benitz et al. | |
| 6,118,447 A | 9/2000 | Harel | |
| 6,119,247 A | 9/2000 | House et al. | |
| 6,195,765 B1 | 2/2001 | Kislanko et al. | |
| 6,226,407 B1 | 5/2001 | Zabih et al. | |
| 6,249,882 B1 | 6/2001 | Testardi | |
| 6,282,701 B1 | 8/2001 | Wygodny et al. | |
| 6,292,171 B1 | 9/2001 | Fu et al. | |
| 6,295,515 B1 * | 9/2001 | Kurshan | G06F 11/3608 703/13 |
| 6,317,223 B1 | 11/2001 | Rudak et al. | |
| 6,331,855 B1 | 12/2001 | Schauser et al. | |
| 6,353,897 B1 | 3/2002 | Nock et al. | |
| 6,356,931 B2 | 3/2002 | Ismael et al. | |
| 6,370,589 B1 | 4/2002 | Sieber et al. | |
| 6,466,329 B1 | 10/2002 | Mukai | |
| 6,470,346 B2 | 10/2002 | Morwood | |
| 6,476,858 B1 | 11/2002 | Ramirez et al. | |
| 6,502,045 B1 | 12/2002 | Biagiotti | |
| 6,606,115 B1 | 8/2003 | Alicandro et al. | |
| 6,708,217 B1 | 3/2004 | Colson et al. | |
| 6,710,790 B1 | 3/2004 | Fagioli | |
| 6,772,107 B1 | 8/2004 | La Cascia et al. | |
| 6,829,394 B2 | 12/2004 | Hiramatsu | |
| 6,867,789 B1 | 3/2005 | Allen et al. | |
| 6,904,389 B2 | 6/2005 | Hornberger et al. | |
| 6,907,546 B1 | 6/2005 | Haswell et al. | |
| 6,920,509 B1 | 7/2005 | Matsuda et al. | |
| 6,980,686 B2 | 12/2005 | Kuwabara | |
| 7,046,848 B1 | 5/2006 | Olcott | |
| 7,120,299 B2 | 10/2006 | Keskar et al. | |
| 7,218,795 B2 | 5/2007 | Trifonov et al. | |
| 7,222,265 B1 | 5/2007 | LeSuer et al. | |
| 7,241,993 B2 | 7/2007 | Nakasuji et al. | |
| 7,298,412 B2 | 11/2007 | Sannoh et al. | |
| 7,386,833 B2 | 6/2008 | Granny et al. | |
| 7,406,191 B2 | 7/2008 | Fuji et al. | |
| 7,683,881 B2 | 3/2010 | Sun et al. | |
| 7,769,895 B1 | 8/2010 | Williams et al. | |
| 7,797,409 B1 * | 9/2010 | Secer | H04L 41/22 709/224 |
| 7,849,476 B2 | 12/2010 | Stevens et al. | |
| 8,055,015 B2 | 11/2011 | Bouzar | |
| 8,091,132 B2 * | 1/2012 | Ansari | H04L 63/1408 726/23 |
| 8,321,894 B2 | 11/2012 | Yoshida et al. | |
| 8,610,734 B2 | 12/2013 | Emerson et al. | |
| 8,671,394 B1 * | 3/2014 | Taillefer | G06F 11/3664 717/124 |
| 8,903,688 B1 | 12/2014 | Aldrich et al. | |
| 9,658,931 B2 | 5/2017 | Simons et al. | |
| 10,157,612 B2 * | 12/2018 | Reich | G10L 15/22 |
| 10,853,229 B2 | 12/2020 | Edwards et al. | |
| 2001/0002697 A1 | 6/2001 | Hiroi et al. | |
| 2001/0022861 A1 | 9/2001 | Hiramatsu | |
| 2001/0055415 A1 | 12/2001 | Nozaki | |
| 2002/0029259 A1 | 3/2002 | Okada et al. | |
| 2002/0039436 A1 | 4/2002 | Alumot et al. | |
| 2002/0054104 A1 | 5/2002 | Berczik et al. | |
| 2002/0056075 A1 | 5/2002 | Hamilton et al. | |
| 2002/0099978 A1 | 7/2002 | Kraffert | |
| 2002/0100014 A1 | 7/2002 | Iborra et al. | |
| 2002/0101519 A1 | 8/2002 | Myers | |
| 2002/0111813 A1 | 8/2002 | Capps | |
| 2002/0141641 A1 | 10/2002 | Zhu | |
| 2002/0152169 A1 | 10/2002 | Dutta et al. | |
| 2003/0012414 A1 | 1/2003 | Luo | |
| 2003/0020751 A1 | 1/2003 | Safa et al. | |
| 2003/0026457 A1 | 2/2003 | Nahum | |
| 2003/0053675 A1 | 3/2003 | Kuwabara | |
| 2003/0056150 A1 | 3/2003 | Dubovsky | |
| 2003/0058277 A1 | 3/2003 | Bowman-Amuah | |
| 2003/0065654 A1 | 4/2003 | Ikushima | |
| 2003/0066031 A1 | 4/2003 | Laane | |
| 2003/0071908 A1 | 4/2003 | Sannoh et al. | |
| 2003/0115595 A1 | 6/2003 | Stevens et al. | |
| 2003/0123733 A1 | 7/2003 | Keskar et al. | |
| 2003/0139918 A1 | 7/2003 | Hardwick et al. | |
| 2003/0153823 A1 | 8/2003 | Geiser et al. | |
| 2003/0185431 A1 | 10/2003 | Hong et al. | |
| 2003/0198385 A1 | 10/2003 | Tanner et al. | |
| 2003/0204626 A1 | 10/2003 | Wheeler et al. | |
| 2004/0017513 A1 | 1/2004 | Takahashi et al. | |
| 2004/0044514 A1 | 3/2004 | Granny et al. | |
| 2004/0049530 A1 | 3/2004 | Lok et al. | |
| 2004/0076323 A1 | 4/2004 | Fuji et al. | |
| 2004/0081341 A1 | 4/2004 | Cherek et al. | |
| 2004/0181754 A1 | 9/2004 | Kremer et al. | |
| 2004/0201709 A1 | 10/2004 | McIntyre et al. | |
| 2004/0255276 A1 | 12/2004 | Rovang et al. | |

(56) References Cited

U.S. PATENT DOCUMENTS

| | | | |
|---|---|---|---|
| 2004/0260993 | A1 | 12/2004 | Griffin et al. |
| 2005/0008212 | A1 | 1/2005 | Ewing et al. |
| 2005/0031165 | A1 | 2/2005 | Olson et al. |
| 2005/0035877 | A1 | 2/2005 | Kim |
| 2005/0082476 | A1 | 4/2005 | Hiroi et al. |
| 2006/0228040 | A1 | 10/2006 | Simon et al. |
| 2007/0131877 | A9 | 6/2007 | Hiroi et al. |
| 2007/0217687 | A1 | 9/2007 | Arima |
| 2007/0283327 | A1 | 12/2007 | Mathew et al. |
| 2008/0195257 | A1 | 8/2008 | Rauch et al. |
| 2009/0052750 | A1 | 2/2009 | Steinberg et al. |
| 2009/0087042 | A1 | 4/2009 | Steinberg et al. |
| 2009/0148033 | A1 | 6/2009 | Alumot et al. |
| 2010/0197376 | A1 | 8/2010 | Kerr |
| 2011/0145643 | A1* | 6/2011 | Kumar .............. G06F 11/263 714/33 |
| 2011/0145653 | A1* | 6/2011 | Broadfoot .......... G06F 11/3604 714/E11.217 |
| 2012/0047488 | A1 | 2/2012 | Ambichl et al. |
| 2012/0180028 | A1* | 7/2012 | Saji .................... G06F 11/3664 717/132 |
| 2013/0212054 | A1* | 8/2013 | Shankar ............. G06F 9/4498 706/45 |
| 2014/0208222 | A1 | 7/2014 | Simons et al. |
| 2015/0052095 | A1* | 2/2015 | Yang .................. G06F 8/10 706/47 |
| 2015/0106653 | A1 | 4/2015 | Adler et al. |
| 2016/0246287 | A1 | 8/2016 | Modgil |

FOREIGN PATENT DOCUMENTS

| | | |
|---|---|---|
| WO | 0019320 | 4/2000 |
| WO | 03053058 A1 | 6/2003 |

OTHER PUBLICATIONS

Great Britain Patent Application No. GB1602423.4 GB Observations under Section 21 dated Oct. 9, 2017 (3 pages).

Fowler, Martin et al., "UML Distilled Second Edition A Brief Guide to the Standard Object Modeling Language," Addison Wesley, Aug. 1999, ISBN: 0-201-65783-X downloaded from http://citeseerx.ist.psu.edu/viewdoc/download?doi=10.1.1.183.2984&rep=rep1&type=pdf on Feb. 8, 2018 (234 pages).

Non-Final Office Action for U.S. Appl. No. 17/081,965 (dated Oct. 14, 2021).

Notice of Allowance and Fee(s) Due for U.S. Appl. No. 15/429,391 (dated Jul. 27, 2020).

Notice of Allowance and Fee(s) Due and Examiner-Initiated Interview Summary for U.S. Appl. No. 15/429,387 (dated Jul. 29, 2020).

Final Office Action for U.S. Appl. No. 15/429,387 (dated Oct. 2, 2019).

Final Office Action for U.S. Appl. No. 15/429,391 (dated Sep. 27, 2019).

Non-Final Office Action for U.S. Appl. No. 15/429,391 (dated Jan. 2, 2019).

Non-Final Office Action and Examiner-Initiated Interview Summary for U.S. Appl. No. 15/429,387, (dated Dec. 31, 2018).

Notice of Allowance and Fee(s) Due and Examiner-Initiated Interview Summary for U.S. Appl. No. 14/219,953 (dated Jan. 17, 2017).

Great Britain Patent Application No. GB1602421.8 GB Observations under Section 21 dated Nov. 24, 2017 (2 pages).

Combined Search and Examination Report dated Apr. 4, 2016 for British Application No. GB1602421.8 (6 pages).

Non-Final Office Action for U.S. Appl. No. 14/219,953 (dated May 9, 2016).

Non-Final Office Action for U.S. Appl. No. 12/963,620 (dated Aug. 27, 2015).

Final Office Action for U.S. Appl. No. 14/219,953 (dated Jan. 16, 2015).

Non-Final Office Action for U.S. Appl. No. 14/219,953 (dated Oct. 3, 2014).

Advisory Action, Applicant-Initiated Interview Summary and AFCP 2.0 Decision for U.S. Appl. No. 17/081,965 (dated May 27, 2022).

Final Office Action for U.S. Appl. No. 17/081,965 (dated Mar. 16, 2022).

Notice of Allowance for U.S. Appl. No. 17/081,965 (dated Jul. 14, 2022).

* cited by examiner

METHOD OF, AND APPARATUS FOR, TESTING COMPUTER HARDWARE AND SOFTWARE

CROSS-REFERENCE TO RELATED APPLICATION

This application is a continuation of U.S. patent application Ser. No. 15/429,387, filed Feb. 10, 2017, which claims the benefit of United Kingdom Patent Application No. 1602423.4, filed Feb. 10, 2016, the content of each being incorporated by reference in their entirety for all purposes.

STATEMENT REGARDING FEDERALLY SPONSORED RESEARCH OR DEVELOPMENT

Not applicable.

BACKGROUND

The present invention relates to a method of, and apparatus for, testing computer hardware and software configurations. More particularly, the present invention relates to a method of, and apparatus for, testing computer hardware and software configurations with improved usability, reliability, productivity and quality.

Modern software products can be increasingly complex, as can the devices that run these products. Software applications are now run on modern devices such as smartphones, tablets, smart watches, portable computers as well as the traditional personal computer (PC). To justify the cost of development, and to meet consumer needs, it is often required to roll out a software application across a range of different devices and operating systems. A program developer often has to take into account different operating systems, communication protocols and system hardware when developing new software. In addition, software is also increasingly distributed. On, for example, smartphones and laptop computers, stand-alone software installed on a single computer is increasingly being replaced by applications (or "apps") or other client components which communicate with several server components. In turn, these server components may communicate with other servers, increasing the complexity of design. As a result, it is often difficult to ensure that a software product is functional across a complete range of devices and operating systems, and that any errors, flaws, failures, or faults (otherwise known as 'bugs') in the software product are identified. Typically, these 'bugs' are only discovered when the software is run. The testing of a software product, pre-launch, is therefore important to a software developer.

BRIEF SUMMARY OF THE DISCLOSURE

Software testers and test engineers commonly test the functionality and behaviour of a program both pre and post launch. When performing testing, it is desirable to test out the software on a large number of devices and operating systems to ensure the product is ready for widespread sale for (and can be supported by) all types of computer system. A program which works well on one type of device may experience difficulties running on another type of device. The testing can therefore be a time consuming exercise. Accordingly, the test engineer may want to test multiple devices without having to physically interface with each System Under Test (SUT). Typically the same test will need to be executed a number of different times on the same operating system, testing out different configurations of the system and different use patterns. Furthermore, when having to perform the same test on a number of different devices, the test engineer would ideally want to run the same sequence of steps without actually having to input each and every step for every test.

One of the most important times to test software is when new versions of the software are released. When such new versions are released, a development team typically creates a "candidate" version of the software. The software testers then test it to find bugs and send the candidate version back to the development team for improvement. The development team then creates a new "candidate". The testers then re-test it to find further bugs and again send it back to development. This loop continues until the software works correctly and it is delivered to customers.

At some further point in time, the development team will typically add some new features to the existing program. The testers then not only have to test the new features, but also that the old features have not 'broken' (i.e. ceased to operate as desired) with the introduction of and/or interaction with the changes. This is called "regression testing". Therefore over the life of a software product, a single test case will be executed 10s, 100s, possibly 1000s of times.

Test programs typically test a SUT by interacting with the SUT and validating the state of the SUT according to an input test description (also known in the art as a 'test script'). A test description typically comprises two main elements—operations and verifications (sometimes called 'validations').

Operations may be instructions to carry out certain functions or events on the SUT—for example, a mouse click in a particular region, text entered into a particular box, button or key presses or other interactions. Verifications may be observations to ensure that the SUT is in the expected state or that a particular operation has been carried out successfully. This may, for example, be in the form of checking that a value has been entered into a database or that a GUI image has appeared on the SUT screen as required.

A test description may be a 'manual test description' which is used by a person to perform a test, or it may be an 'automated test description' which is input into a test program which then executes the test (typically without any human interaction).

Test descriptions can take many forms including but not limited to text instructions, software in source code or binary form, work-flows in a diagrammatical form (such as a flow chart). Typically, test descriptions contain lines of text or other characters that when executed by the test program cause the SUT to perform a specific sequence of operations or executable functions.

The sequence of operations (or executable functions) is defined entirely by the tester. However, a test description may cover multiple paths in dependence upon particular variables. For example, consider a test operable to schedule a money transfer in 5 days from the present time. The exact sequence of operations will be different if the current date is the $28^{th}$ of the month compared with the $5^{th}$ of the month since in the former case the test must handle the transfer being in the following month. As another example, a retail website may respond differently if a product is in stock or out of stock and the test description can be written to cover both these use scenarios.

Once the test description is written, executing (or 'running') the test description through the test program allows the system under test to be tested automatically, without requiring a tester to provide input to the testing process, other than initiating it. However, in some cases, tester input may be utilised to input particular configurations (e.g. type of browser to be tested) or particular data (e.g. what username to login as).

The specific sequence of operations and validations is defined deterministically by the tester. Therefore, when the test description is run on the SUT, the only variable in the automated test is the behaviour of the SUT (e.g. whether the operations are executed correctly or incorrectly). The SUT may also create allowable variations in the exact sequence of operations.

For example, consider an application being tested on a smartphone. At any point during the test, the smartphone may display a "Low Battery" dialogue. Test descriptions are typically designed so if the device is not in an expected state, the test will check to see if the unexpected dialogue is something that is known and can be dealt with. So, for example, a test description so equipped may be able to execute operations to detect and clear the "low battery" dialogue and then resume the normal test.

Some test programs that use automated test descriptions are known. One test program that helps software engineers automate the testing process is 'eggPlant®' by TestPlant®. The eggPlant® software tool allows a user to create and subsequently execute an automated test description to test a large number of SUTs.

When designing a test description for a particular purpose (e.g. testing some new functionality of the software), a number of factors have to be considered. For example, a number of different operations (or functions) may need to be executed in many different combinations and arrangements to test the software thoroughly. This is to ensure that as many "pathways" through the various allowable functions of an application are tested in as possible. The extent to which the various permutations of sequential operations/functions in the application are tested is known as the testing "coverage".

Coverage is a particularly important aspect of testing. Consider, for example, a typical "login" screen which presents the user with three operations—enter a username, enter a password, and click on a "login" button. If each of these operations can be performed exactly once then there are six different "pathways" to be tested. However, if alternatives are added to include data variations (e.g. the user name to use) and each operation is allowed to be performed multiple times (e.g. a user enters their password and then changes the password), then there are potentially an infinite number of "pathways".

In addition, it is important that both logically valid and invalid pathways must be tested. For example, in the example above, clicking on the "login" button before a username and password have been entered should not successfully log the user in. Nevertheless, this pathway must still be tested to ensure that it does indeed not log the user in or result in any other undesirable application behaviour.

However, a single test description only allows a single deterministic flow path (with some specifically allowed variation) through the operations/functions of an application to be tested. To enable adequate coverage of the various possible sequential permutations of operations/functions, a known approach is for a tester to develop scripts and re-use specific elements of the script in an ad hoc manner to generate different pathways through the application to be tested. However, this process is cumbersome and may require the tester to generate hundreds if not thousands of different scripts. Further, it is difficult to track whether all the necessary combinations and "pathways" through the functions have been explored to ensure the software has been tested to the required standard. This is particularly important when existing test cases are updated to test new functionality.

Attempts have been made to fully "model" a system under test (or application under test) so that automated test descriptions (or automated test scripts) can be generated. However, these models are usually extremely complex and require a lot of effort to create and maintain. Further, given the complexity, these models often have errors which are difficult to detect.

The complexity, high creation effort, and high maintenance effort, are a result of two typical attributes of such models. Firstly, since automated test descriptions are generated from the model, the model requires a very high base level of knowledge about the function and operation of the SUT in order to operate correctly. The model must include implementation details of the application-under-test, which may include, for example, identifiers for the relevant GUI elements on the application-under-test. Changes to the implementation details of the application-under-test therefore require changes to the model, and so the models become difficult to maintain. This "all or nothing" approach makes designing and maintaining such models a complex and lengthy process and this may not be suitable for all testing applications.

Second, these models typically function by defining allowable pathways through the operations. For example, a model may define that the operation "enter username" should be followed by the operation "enter password". But as described earlier, the number of potential pathways through the operations of an application-under-test which must be tested (both valid and invalid pathways) is huge. Such models quickly become very complex, require high levels of maintenance, and typically omit important pathways. As described above, it is exceptionally difficult to model every possible aspect of an application and its behaviour, the "model" may be deficient and incorrect in numerous aspects and not comprise a true representation of the application-under-test.

Accordingly, there is a technical problem in the art that current methods for production of test descriptions are inefficient, overly complex and can lead to errors in the testing approach for a large number of testing cases.

According to a first aspect of the present invention there is provided a method for defining an automated test configured, when executed, to test a system under test comprising one or more computer programs being executed on one or more computer devices, the system under test comprising a plurality of operational states, at least one operational state having one or more executable actions associated therewith operable to execute predetermined operations and/or transition the system under test between operational states, the method comprising the steps of: a) defining an executable model of the system under test comprising a plurality of model states, wherein at least some of the model states are representative of operational states of the system under test; and b) defining one or more selectable model actions, each model action being representative of one or more executable actions on the system under test and configured such that one or more preconditions are assignable thereto, wherein each model action is configured to be available to be selected unless any preconditions assigned to the respective model action are not satisfied, wherein the model is configured such that, when executed, a test program is operable to select a sequence of available model actions to define an automated test.

In one embodiment, the method further comprises the step of: c) assigning one or more preconditions to one or more model actions.

In one embodiment, the method further comprises the step of: d) utilising a test program to select a sequence of available model actions to define an automated test.

In one embodiment, step d) further comprises: e) selecting an available model action; f) updating any preconditions modified by the selection of the available model action; and g) repeating steps e) and f) to define a sequence of selected model actions.

In one embodiment, prior to step e), the method comprises: h) defining an initial state of the model.

In one embodiment, one or more model actions are operable, when selected, to cause the model to transition from one model state to another model state.

In one embodiment, step c) further comprises: i) defining state preconditions for one or more model actions, wherein the state preconditions specify that a respective model action is only selectable when the model is in the one or more predefined model states.

In one embodiment, one or more model actions comprise state preconditions specifying a single predefined model state such that the respective model actions are only available for selection if the predefined model state is the current model state.

In one embodiment, if no state preconditions are defined for a respective model action, the model action is available to be selected in any model state.

In one embodiment, step c) further comprises: j) defining, for one or more model actions, action preconditions which must be met in order for the respective model action to be available for selection.

In one embodiment, the action preconditions comprise the previous selection of one or more model actions and/or values of one or more parameters.

In one embodiment, one or more model actions comprise at least one data parameter, wherein the or each data parameter comprises a variable to be input to an executable action of the system under test.

In one embodiment, a data parameter may comprise one or more of the following: one or more numerical value; a numerical range; a set; a character string; or a true/false variable.

In one embodiment, one or more data parameters may comprise a plurality of different values.

In one embodiment, a value of the data parameter is selected from a plurality of possible values when the respective model action is selected.

In one embodiment, the value of the data parameter is selected based on one or more of: a random variable; a weighting; or a variable factor.

In one embodiment, the variable factor for a given value is dependent upon the number of times the value has been previously selected.

In one embodiment, one or more model actions are assigned a weight value, wherein the selection of an available model action from a plurality of available model actions is dependent upon the weight value.

In one embodiment, one or more model actions are associated with one or more test description sections, wherein each test description section comprises one or more operation commands defining operations to be executed, in use, on the one or more executable actions of the system under test associated with the respective model action.

In one embodiment, the test description sections comprise one or more validation commands operable, in use, to determine whether the one or more operation commands have been executed correctly.

In one embodiment, the selection of an available model action from a plurality of available model actions is dependent upon the number of times that the model action has been selected in previous automated tests.

In one embodiment, the preconditions for one or more model actions are predefined by a user.

According to a second aspect of the present invention, there is provided a method of automated testing, the method comprising: k) defining a sequence of model actions in accordance with the method of the first aspect; l) based on the defined sequence of model actions, executing a sequence of operations to execute one or more executable actions of the system under test as part of an automated test.

In one embodiment, step l) is carried out after each selection of a model action in step k) such that step l) comprises executing one or more operations associated with a selected model action on the system under test prior to selection of a subsequent action in step k).

In one embodiment, step k) comprises executing the sequence of operations on the system under test after all model actions in the sequence have been selected.

According to a third aspect of the present invention, there is provided a computer readable medium comprising instructions configured when executed to perform the method of the first or second aspects.

According to a fourth aspect of the present invention, there is provided a computer system comprising: a computer readable medium according to the third aspect; and a processor device configured to execute the instructions on the computer readable medium.

According to a fifth aspect of the present invention, there is provided computing apparatus for defining an automated test configured, when executed, to test a system under test comprising one or more computer programs being executed on one or more computer devices, the system under test comprising a plurality of operational states, at least one operational state having one or more executable actions associated therewith operable to execute predetermined operations and/or transition the system under test between operational states, the computing apparatus being configured to: a) define an executable model of the system under test comprising a plurality of model states, wherein at least some of the model states are representative of operational states of the system under test; and b) define one or more selectable model actions, each model action being representative of one or more executable actions on the system under test and configured such that one or more preconditions are assignable thereto, wherein each model action is configured to be available to be selected unless any preconditions assigned to the respective model action are not satisfied, wherein the model is configured such that, when executed, a test program is operable to select a sequence of available model actions to define an automated test.

In one embodiment, the computing apparatus is further configured to execute the automated test on the system under test. In one embodiment, the computing apparatus is further configured to execute the automated test on the system under test using a test program.

According to a sixth aspect of the present invention, there is provided computing apparatus operable to test a system under test comprising one or more computer programs being executed on one or more computer devices, the system under test comprising a plurality of operational states, at least one operational state having one or more executable actions associated therewith operable to execute predetermined operations and/or transition the system under test between operational states, the computing apparatus being configured to: a) utilise an executable model of the system under test comprising a plurality of model states, wherein at least some of the model states are representative of operational states of the system under test; and b) select a sequence of selectable model actions to define an automated test, each model action being representative of one or more executable actions on the system under test and configured such that one or more preconditions are assignable thereto, wherein each model action is configured to be available to be selected unless any preconditions assigned to the respective model action are not satisfied; and c) execute the automated test on the system under test.

BRIEF DESCRIPTION OF THE DRAWINGS

Embodiments of the present invention will now be described in detail with reference to the accompanying drawings, in which.

DETAILED DESCRIPTION OF THE PREFERRED EMBODIMENTS

There is presented herein a method for creating and executing test descriptions which enable a tester to build and develop complex scripts easily and which enables the testing scripts to be executed in a modular manner enabling very high coverage of required use scenarios with reduced effort.

Test Computer System

Figure 1:
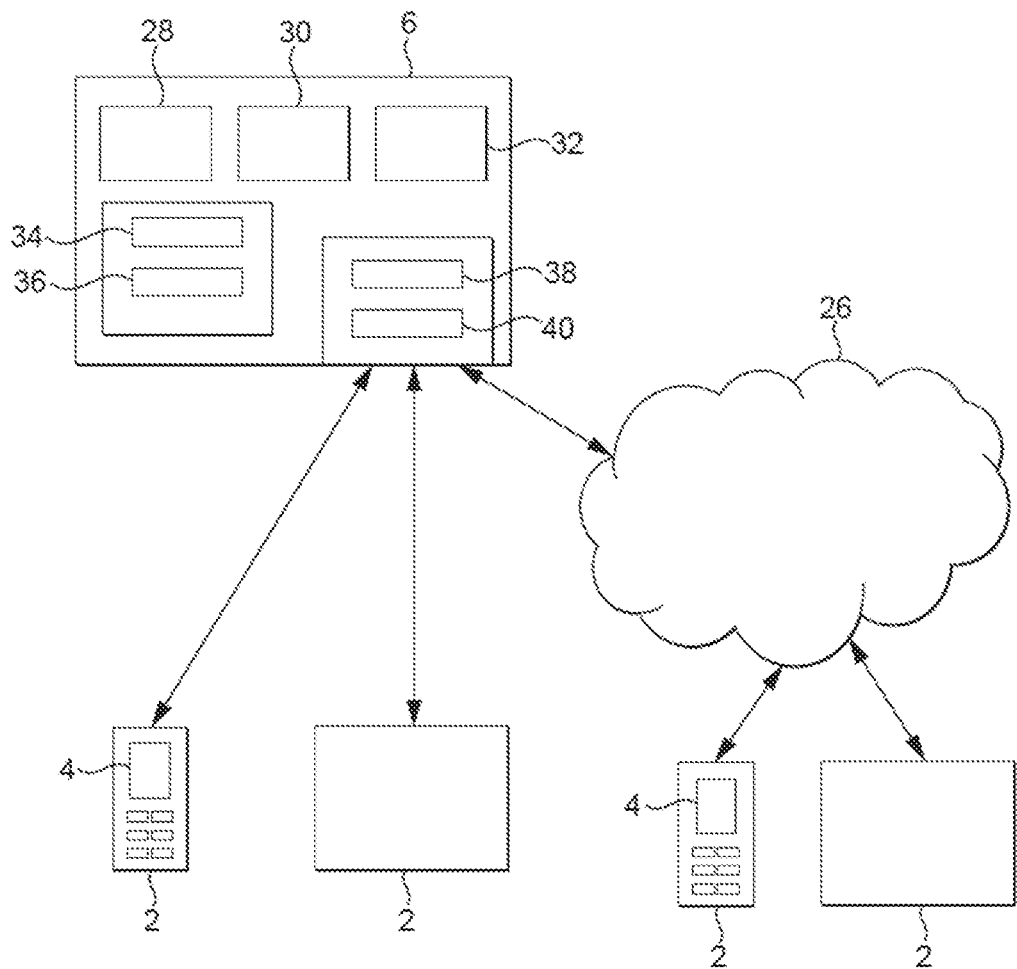
FIG. 1 shows an example of a test computer system that is in communication with several systems under test.

An example of a test computer system set-up suitable for use with the present invention is shown in FIG. 1. Two SUTs 2 are in direct communication with the test computer system 6, for example using infrared or Bluetooth communications, or over a local wired or wireless network, whilst two other SUTs are in communication with the test computer system 6 via the internet 26.

The test computer device/system 6 may be any suitable computer device, system, collection of computing devices or collections of computing systems. The test computer system 6 may, in non-limiting examples, comprise any one or more of: one or more processors 28; one or more controller devices 30; one or more memory devices 32; one or more user input devices 36; one or more output devices 34 such as, but not limited to, a GUI; one or more communication devices such as a transmitter 38 and/or a receiver device 40.

Any one or more of the processor 28, controller 30, receiver 40, transmitter 38, or memory 32 may be a physical, non-transitory, device or apparatus. The devices/apparatus may be electronic, opto-electronic or optical.

The processor 28 may, in principle, be any suitable processing device such as, but not limited to, a microprocessor, an application-specific instruction-set processor, a graphics processing unit (GPU/VPU), a physics processing unit (PPU), a digital signal processor, a network processor, a front end processor. Examples of processors include, but are not limited to, an Intel® processor, an AMD® processor.

The controller 30 may be any suitable controller including any one or more of a controller chip, a controller board, a mainframe controller, an external controller or any other suitable controller. The controller may be, for example, a micro-controller.

The memory 32 may, in principle be any suitable memory including any one or more of: mechanical memory such as, but not limited to, magnetic tape drive, hard-drive, optical drive; volatile and non-volatile memory such as, but not limited to, RAM, DRAM, SRAM, SDRAM, T-RAM, Z-RAM, TTRAM, ROM, Mask ROM, PROM, EPROM, EEPROM, NVRAM.

The SUT 2 may be remote from the test computer system 6. The term 'remote' is intended to mean that the computer system or device is physically separate to the test computer system 6 such that when the test computer system and remote computer system interact, one or more transmitter and receiver devices are used to send and receive data over one or more communication channels. The communication channel may be any suitable channel using any of electrical, electromagnetic or optical signals.

Figure 2:
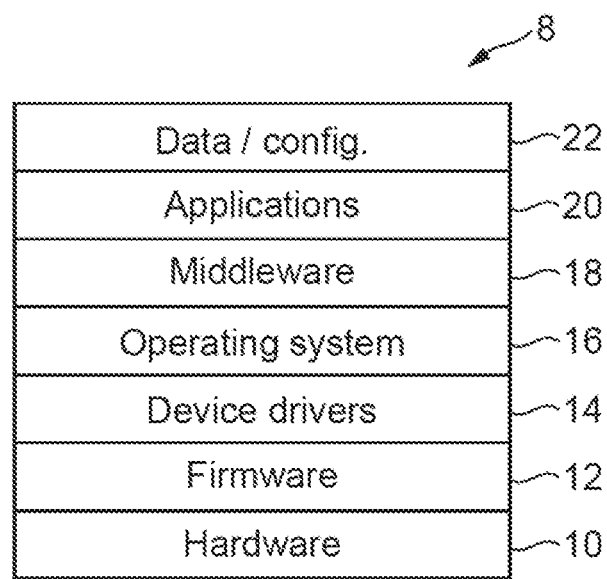
FIG. 2 shows an example of a hardware/software stack model representation for a system under test.

The SUT 2 can be any computing system or device running one or more computer programs. FIG. 2 shows an example model of a hardware/software stack 8 for a SUT 2. The test computer system 6 can control features or aspects of any of these layers by interacting with the SUT 2. The SUT 2 in principle can include any one or more parts of the hardware/software stack 8 of the system being tested 2, i.e. the hardware 10, firmware 12, device drivers 14, operating system 16, middleware 18, applications 20 and data/config 22. Typically a SUT 2 will at least comprise hardware 10 and an operating system 16. FIG. 2 is only an example of a hardware/software stack model 8. Other models with further details and layers may also be used to define a SUT 2. The term 'computer program' is taken to mean any of (but not necessarily limited to) an application program 20, middleware 18, an operating system 16, firmware 12 or device drivers 14 or any other medium supporting executable program code.

The term 'hardware' 10 is taken to mean any one or more of the collection of physical elements that constitutes a computer system/device such as, but not limited to, a processor, memory device, communication ports, input/output devices. The term 'firmware' 12 is taken to mean any persistent memory and the program code/data stored within it, such as but not limited to, an embedded system. The term 'device drivers' 14 is taken to mean the one or more programs that operate to control a particular type of device incorporated into or attached to the computer device/system.

The term 'operating system' 16 is taken to mean the one or more pieces, often a collection, of software that manages computer hardware and provides common services for computer programs. The term 'middleware' 18 is taken to mean the computer software that provides services to software applications beyond those available from the operating system 16. The term "applications" 20 is taken to mean the computer software that causes a computing device or system to perform tasks that are typically beyond the running of the computer itself. The term 'data/config.' 22 is taken to be any other information provided to the SUT 2 that can be used to affect its running or output, for example data input into the application program 20.

A SUT 2 may comprise a different physical device to another SUT 2 as shown in FIG. 1. For example, the SUTs may be different physical computing devices running the same application program 20 using the same or different application program 20.

Alternatively, a SUT 2 may differ from another SUT 2 simply by running a different operating system 16 and/or different version of one or more application programs 20. For example, a first SUT 2 may be a PC (i.e. the computer hardware) running an operating system 16 and a first version of an application program 20, whereas a second SUT 2 may be the same hardware 10 as the first SUT 2, running the same type and version of the operating system 16 but running a second, updated version of the application program 20. In principle, one SUT 2 may differ from another SUT 2 by virtue of any different hardware/software configuration. For example any change in any one or more of the layers in the stack 8 of FIG. 1 from hardware 10 to application program 20, may give rise to a different SUT 2.

Test Computer Program

Typically when the test computer device interacts with the SUT 2, it does so using a test program that executes the test description 24. Typically, but not always, the test program is hosted on the test computer system 6. The description 24, when run (executed) by the test program, typically causes the SUT 2 to be controlled by the test computer system 6. For example, a line in the test description 24 run by the test program with the phrase "click button X" will cause button 'X' on the GUI 4 of the SUT 2 to be selected and the operation associated with the selection of that button to be started upon the SUT 2.

Test programs are known to test the functionality of a SUT within an arrangement such as the exemplary configuration of FIG. 1. Typically the test program is run upon a computing device or computing system that is remote from the SUT. The computer system running the test program is however in communication with the SUT so that the test program can interact with the SUT. The SUT may be, for example, a PC running a application software upon an operating system, for example, Windows®, Android® or iOS®.

In non-limiting examples, the test program may comprise a plurality of components. A first component may interact with the model 150 (described later). A second component may be operable to execute test descriptions (described later) to interact with the SUT.

However, ny suitable test program may be used with the present invention. The specific nature of the test program and its functionality is not material to the present invention. However, a number of non-limiting examples will be described below.

For image-based test programs such as eggPlant®, the validation steps operate by identifying expected objects in a GUI image that relate to executable functions that the test description may wish to identify and interact with or indicate the status of the SUT. Once the expected image object has been identified in the GUI image, the test program description can move to the next step in the test. The identification of the expected image object is performed using image analysis. The image analysis searches the GUI image for the expected image object using an existing reference image that is similar or identical to an expected image object. When a match is found, the expected image object is identified.

Figure 3:
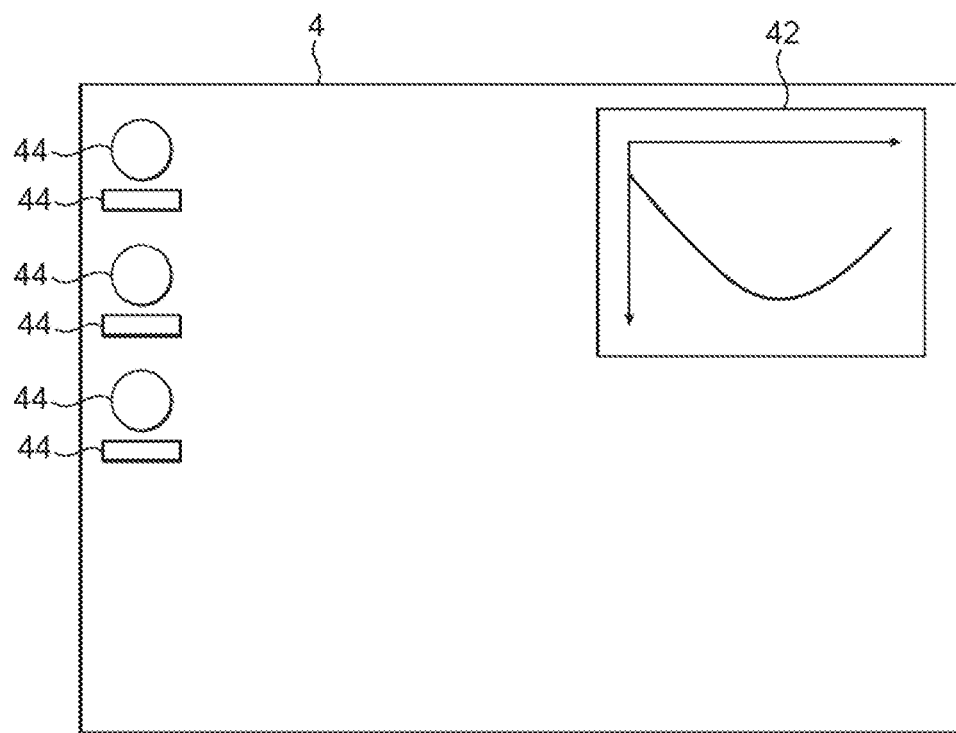
FIG. 3 shows an example of a GUI for a system under test.

In this example, the test program may utilise one or more GUI 4 images received directly or indirectly from the SUT 2. FIG. 3 shows an example of this. Typically the GUI 4 images are "snapshots" of the output of the GUI 4 of the SUT 2 at a particular time. Typically these snapshots are saved as a graphical image file, for example a bitmap, gif or jpeg file. The GUI 4 images may be a snapshot of the whole GUI 4 or one or more portions of the GUI 4. GUI snapshots may be only portions of the GUI image that have changed since a previous GUI image was sent.

The SUT 2 may send these GUI images to the test computer system 6 automatically upon an initial command to start sending the images. Additionally or alternatively the SUT 2 may send one or more GUI images upon a command sent from the test computer system 6. Additionally or alternatively the SUT 2 may send one or more GUI images upon a command sent to the SUT 2 resulting from an instruction from the test program, and/or the test description 24.

However, alternatives to image-based testing may also be used with the approach of the present invention. For example, the test program may interact with the GUI of the SUT 2 using an "object based tool". In other words, the test program may use unique identifiers of the various UI controls on the screen to interact with them via an API.

As a further alternative, the test program may interact with the SUT 2 by calling APIs directly. For example, if the SUT 2 was a web server, it may be tested by using the model to send various sequences of HTTP commands to a server.

Further variations or alternatives of test programs suitable for use with the present invention will be readily apparent to the skilled person.

Test Description

Figure 4:
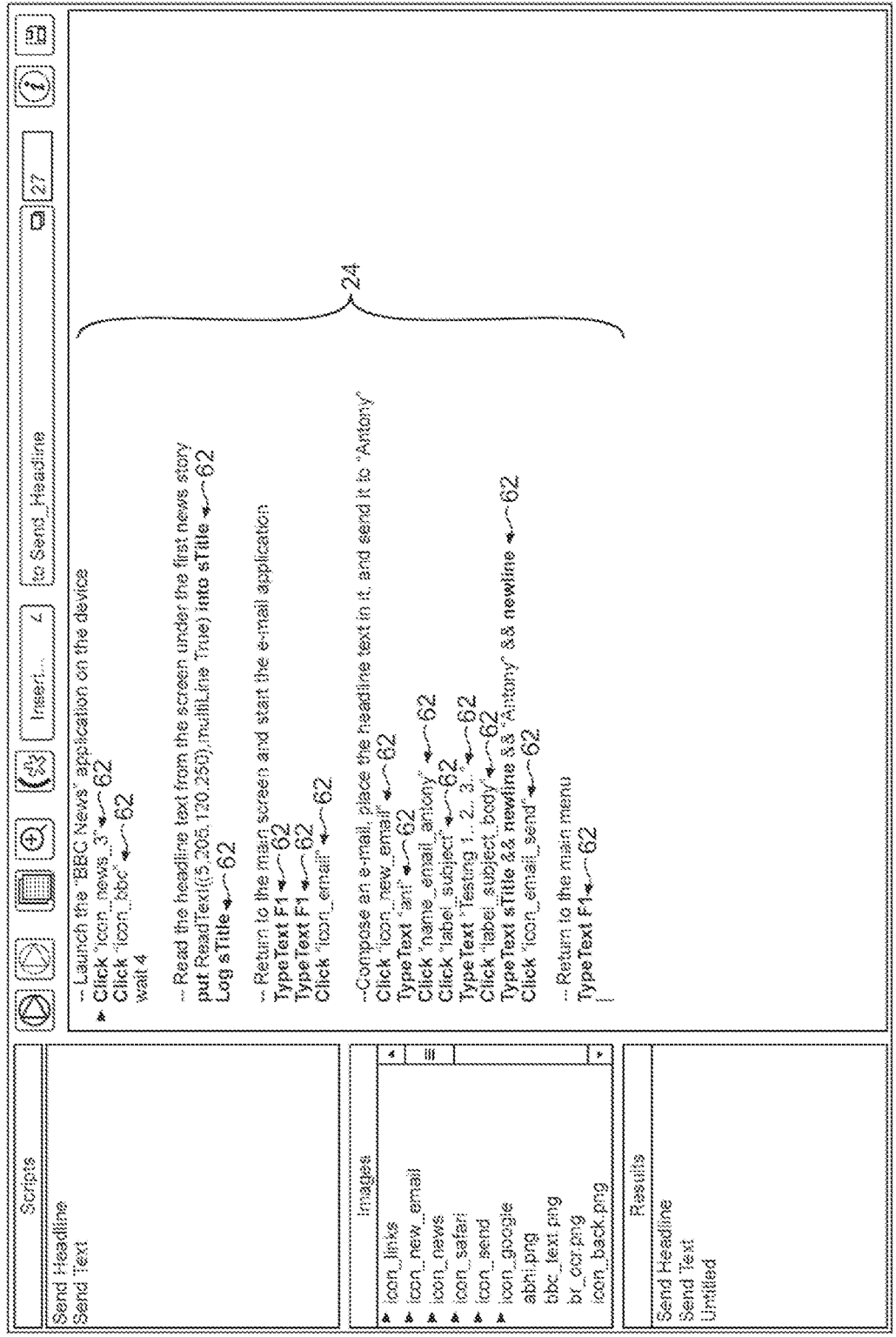
FIG. 4 shows an example of a test description.

FIG. 4 shows an example of a test description 24 run within a test program. The test description 24 comprises multiple lines of text, numbers or other symbols that are typically executed by the test program in a sequential manner. The term "test description" may also be termed a "test script" or an "automated test description".

The description 24 may be written in any suitable scripting language, for example SenseTalk®. Preferably the description is loadable onto a carrier device such as a disc, memory stick or any other suitable electronic data carrier. In non-limiting examples, a test program is used to execute the test description 24. However, the functionality required to execute the test description 24 may be hosted by an operating system or any other software or dedicated hardware, for example the test description 24 may be a standalone executable file itself.

The description 24 is applicable to any suitable form of test program. Therefore, whilst FIG. 4 relates to image-based testing methods, this is not to be taken as limiting. The description 24 may utilise any of the test program examples described above, and any test program approach may be used with the present invention.

The test description 24 forms part of an "automated test". The test description 24 is typically lines 62 of text or other characters that typically contain instructions, that when executed by the test program, cause the SUT 2 to perform particular operations or execute functions. An instruction in the description 24 can include one or more standard commands and/or one or more other pieces of information or data. For example, the command "Typetext" may be followed by the words "This is a test". The test program running the automated test would execute the standard command "Typetext" to cause the SUT 2 to type the words "This is a test" into a particular text entry box on the SUT GUI 4.

The test may be stored using one or more storage device or computer readable media as described herein.

Application-Under-Test

An application to be tested may be in the form of application software provided to the tester, or a technical specification for an application. Alternatively or additionally, the application 50 may comprise a plurality of interacting software elements, and/or may comprise an entire computing system such as a mobile phone, desktop computer or specialist hardware. Non-limiting examples of specialist hardware may include: an aircraft or drone flight control system; in-vehicle software/hardware functions; or specialist computing systems.

Figure 5:
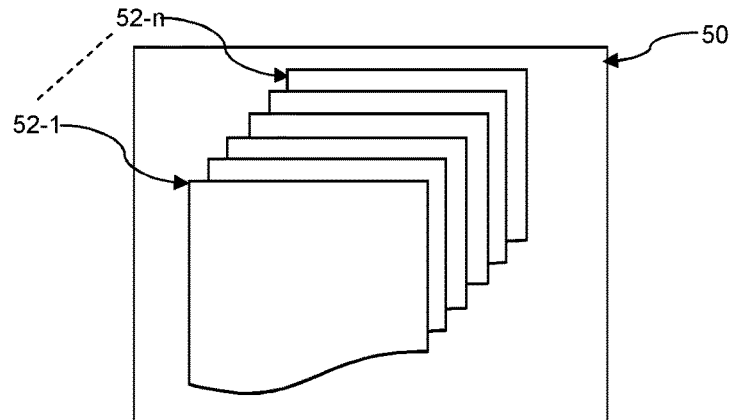
FIG. 5 shows a general example of an application under test illustrating various operational states thereof.

FIG. 5 shows a non-limiting example of an application 50 to be tested which comprises a plurality of operational states 52-1-52-*n*. Whilst six operational states are shown in FIG. 5, this need not be so and n may take any appropriate number.

Each of the operational states corresponds to a particular condition of the application. In most or all of the operational states 52, actions can be carried out particular to that operational state 52 as will be described below. Actions may lead to transitions between operational states 52 as will be described below.

Figure 7:
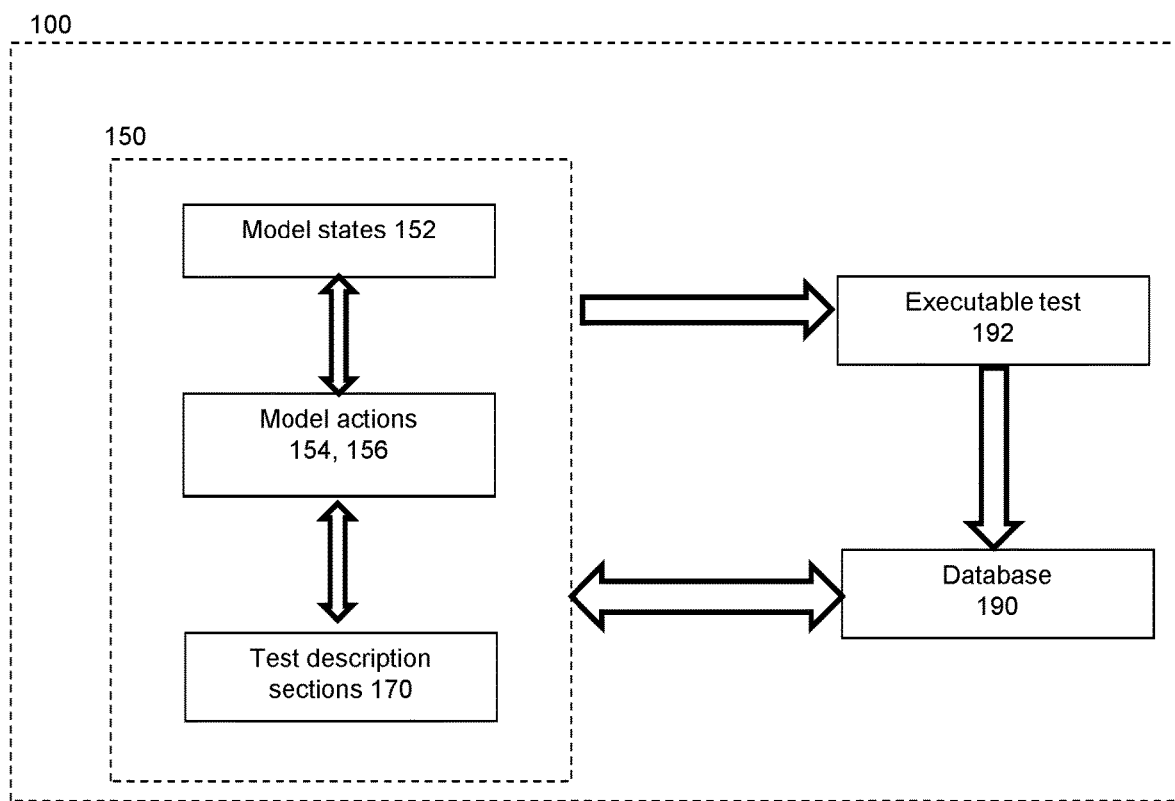
FIG. 7 shows a high-level schematic overview of a test system and model according to an embodiment of the present invention.

By way of non-limiting example, an operational state 52 may correspond to a particular page, screen, setting or configuration of an application. FIG. 7 shows a basic, high-level non-limiting example of an application 50 in the form of an internet banking application. State 52-1 comprises a login page, state 52-2 a home page, state 52-3 a "view accounts" page, state 52-4 a payment page and state 52-5 a settings page Each of these comprises a particular operational state 52 of the application 50. Operations can be carried out which take the application 50 into a different state—for example, from the home page 52-2, the "view accounts" action transitions the application to the "view accounts" operational state, or the "settings" action transitions the application to the "settings" operational state as will be described below.

Figure 6:
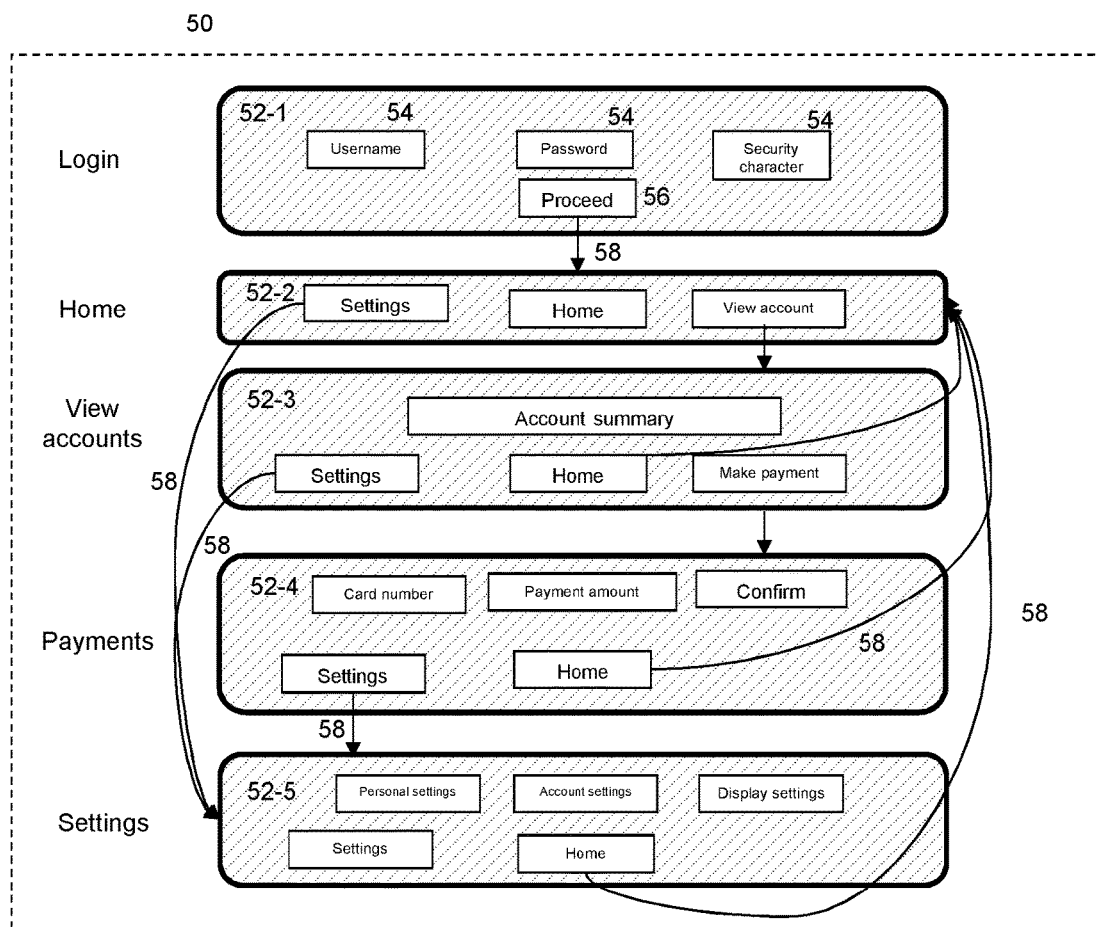
FIG. 6 shows a schematic non-limiting example of an application for an internet banking program illustrating the available operational states thereof.

With reference to FIG. 6, each operational state 52 of the application 50 under test has at least one valid action available in that operational state 52. By action is meant a feature of the application 50 that enables the user to interact with the application in some way, by entering data, selecting a button or link or other interaction with the application 50 or system under test in general. An action may comprise one or more operations and/or validations required to carry out and/or test a specific task. For example, an action may comprise a higher-level "logical" interaction comprising a plurality of inputs or interactions with the SUT. An example may be a "login" action that comprises multiple inputs such as click, select, type etc. In other words, the "action" is a higher-level function which is operable to complete the "login" process, where the "login" process requires a number of discrete operations. Finally, by a valid action is meant an action which is allowed to be executed in that particular state.

Execution of an action 54 in a particular operational state 52 may carry out a specific operation within a particular operational state 52 and/or may cause the application 50 under test to move to a different operational state 52 having different available actions.

Action 54 may be specific to a particular operational state (e.g. login details for usernames and passwords) or may be a global action (e.g. a "home" button or link present in every operational state and which executes the same process when selected). Each operational state 52 is, in general, linked by at least one action which causes the application to move from one operational state to another operational state. However, this need not be the case and in certain scenarios an application may remain in a single operational state 52 or may exist in a plurality of mutually exclusive operational states 52.

Actions may in general be grouped into two categories—actions 54 which relate to operations carried out on the application 50 in a particular state and actions 56 which transition the application 50 into another state. As will be described later, actions 56 which cause a change of operational state 52 may also carry out operations on the current operational state 52 of the SUT before transitioning the application 50 to a new operational state 52.

Actions 54 may comprise dialog boxes, data entry boxes, drop down menus or other features which, when interacted with, cause the application to remain in the same operational state 52. An example from FIG. 6 would be the login actions in operational state 52-1 where username, password and security character information is to be entered. Entering of this information does not cause the state of the application to change unless the "proceed" button is selected.

Correspondingly, transition actions 56 comprise commands or controls which cause the application 50 to transition between operational states 52. For example, in FIG. 6, the "proceed" action will cause the login state 52-1 to transition to the home page operational state 52-2 provided login details have been provided. Once on the home page state 52-2, the "settings" and "view account" actions 56 cause the application 50 to change state to states 52-5 or 52-3 states respectively.

The transitions between states 52 are identified by state changes 58. The state changes 58 in FIG. 6 show the actions 56 in each state which, when executed, lead to transitions between the states 52 of the application 50.

Certain constraints may apply to transitions. For example, the action 56 which, when executed, causes transition 58 between state 52-1 (login screen) and state 52-2 (home page) cannot be executed (i.e. is not a valid action) unless correct login information is provided. Further, selection of actions such as the home button whilst on the home page state 52-2 will result in the state 52-2 remaining the same, although a refresh of the state 52-2 may occur.

Certain actions are present in the main application 50 irrespective of the state of the application 50. For example, with reference to FIG. 6, actions "settings" and "home" are available in all application states 52 apart from the login state 52-1.

The above example is non-limiting and other applications may of course be used. In an alternative example, if the application 50 is an internet shopping application, there may be a login page and a home page representing particular operational states 52 of the application, with actions (e.g. buttons or links) which take the application to other operational states such as, for example, "shopping basket", "search" and "payment details".

It is to be noted that the examples provided above are non-limiting and any suitable application 50 containing operational states 52 could be modelled.

Testing Model

The present invention relates to a method of automated testing and to a method of developing a test description. The present invention utilises a high-level modelling approach which enables a tester to define a particular application (i.e. a computer program running on a computer system to be tested) or system (e.g. a computing system having one or more interacting software elements) in terms of a model comprising a number of pre-defined states, actions and parameters. The model is flexible enough to be used to define a state-machine model, a process model, an action model, and others.

Conventionally, the testing of applications would be carried out in one of two ways—either by a manual "flow approach" or by full model automation. In the "flow approach", a test description may be written which describes a particular path through specific operations of each operational state. The flow is designed by the tester. Various permutations of flow through the operational states of the application will be designed independently and tested.

However, the flow approach has a number of disadvantages. Firstly, the flow approach becomes cumbersome quickly where variation within the flow paths is possible. Consider an example of a login screen having three operations—"enter username", "enter password" and "click submit" which can occur in any order, resulting in six permutations of flow within those operations alone. However, particular operations could be performed multiple times, for example the username could be entered, and then changed. This leads to potentially infinite flow possibilities which simply cannot be adequately tested using a conventional flow path approach where individual test descriptions are crafted for each flow path permutation.

Secondly, the temporal flow through the available operations of each operational state of the model will be specified by the tester. This may cover general use scenarios but, because the flow of operations is specified by a human, the flow will often only include "logical" flows based on typical use profiles. For example, for a banking application, a logical flow may comprise "login"-"check balance"-"make payment"-"log out". However, an arbitrary flow pattern may never be tested and so bugs or other defects in such operation flows may never be tested. For example, using the example of the banking application, an arbitrary flow may be "login"-"log out"-"login"-"settings"-"change password"-"payment"-"settings"-"change password"-"payment"-"home". Such use cases may never be contemplated by a tester and so may not be tested. This creates the potential for errors and bugs in the software to remain unidentified.

Further, operations outside of the "flow" between operational states cannot be tested using the flow approach because these operations are independent of the flow between operational states. For example, altering the volume on a smartphone or pressing the global home button on the smartphone could occur at any arbitrary point during the application run time process. However, these operations do not fit into an order flow within any of the other operations in a temporal operation order flow. Therefore, these operations cannot be tested in a conventional flow approach.

As an alternative known technology to the flow approach is to enable the full automation of application testing using a model approach. In this situation, a full model is able to automatically traverse a set of operations and operational states.

However, such a model requires a low-level test description to be written for every operation and every operational state of the application. The model cannot function otherwise. This is complex and cumbersome for the tester and may require a considerable amount of time to develop.

Further, such models require innate knowledge of which transitions are allowable. This, in turn, defines the pathways through the model. Consider an example where operation "B" is allowed to be executed after operation "A". The model must, then, have a pathway from A to B. However, the generally large number of such available pathways results in the model becoming overly complex and, in more detailed cases, potentially intractable.

Consider a more detailed example. With reference to state 52-1 of FIG. 6, in a traditional model it would be necessary to show allowable transitions between actions. Consequently, it would be necessary to define the following allowable transitions:

-- username -> username
-- username -> password
-- username -> proceed
-- username -> security character
-- password -> username
-- password -> password
-- password -> security character
-- password -> proceed
-- security character (sc) -> sc
-- sc -> username
-- sc -> password
-- sc -> proceed Once these transitions are defined, it then requires a considerable amount of work effort to introduce additional actions. For example, consider a volume button which can be utilised at any point in any operational state of the application. To model this correctly would require a transition from every action to the volume action. The same would apply to any other actions which may be executable by the SUT. As a result, due to this complexity, the peripheral operations such as volume etc. are often not modelled in conventional arrangements. This may result in an incomplete test and undiscovered bugs in the application software.

In contrast, the present invention relates to a testing method and model which avoids the above problems. The method operates by defining a high-level, non-specific model of the application to be tested.

FIG. 7 shows a general schematic view of a test system 100 comprising a model 150 according to an embodiment of the present invention.

The model 150 comprises a plurality of states 152. Some states 152 of the model 150 may correspond to operational states of the application 50. However, this is not to be taken to be limiting and the model 150 may comprise states 152 which do not directly correspond to an operational state of the application 50. For example, a model state 152 may be required which is a start state from which the application is launched.

The model 150 also comprises modelled actions 154, 156 as will be described below. Modelled actions 154, 156 comprise one or more operations which may be carried out within one or more states 152. Whether an action 154, 156 is executable in a given state is specified by a number of preconditions as described in detail below.

In contrast to known arrangements, the model of the present invention only defines actions which are not allowable (via precondition constraints as described below). Therefore, any actions which either have no preconditions or preconditions which are currently met in full in that state and at that point in the execution process are, thus, assumed by the model to be valid and selectable. This reduces the modelling overhead and results in more manageable models. This process also has benefits in terms of coverage and test execution because the model will traverse and executes paths through the various valid actions which may not have occurred to the tester.

Actions broadly comprise three classes: actions 154 which perform operation(s) in the current state and do not change the state, actions 156 which cause a change of state, and global actions 154 which are selectable in any state. However, whilst these distinctions are defined here to assist with understanding of the invention, the properties of any given action 154, 156 are defined by the attributes of an action 154, 156 as will be discussed below.

The model 150 further comprises test description sections 170. The test description sections 170 comprise segments or "snippets" of a test description that can be associated with one or more actions 154, 156 and which are executed when an associated action 154, 156 is selected.

Further, the test system 100 further comprises a database 190 associated with the model 150. The database 190 may store particular data or parameters relating to operation of the model 150 as will be described later. Additionally, the model 150 may, in non-limiting embodiments, modify or update data in the database 190.

In operation, the model 150 generates a test run through the model states 152 by selecting executable actions which are available in a current state 152 of the model 150. Any test description sections 170 associated with a selected action 154, 156 are then executed to generate an executable test 192. This will be described in detail below. The results of the executable test 192 may then be used to update the database 190 (and hence model 150) prior to a further executable test 192.

The components of the model 150 will now be described in detail below.

Model States

Figure 8:
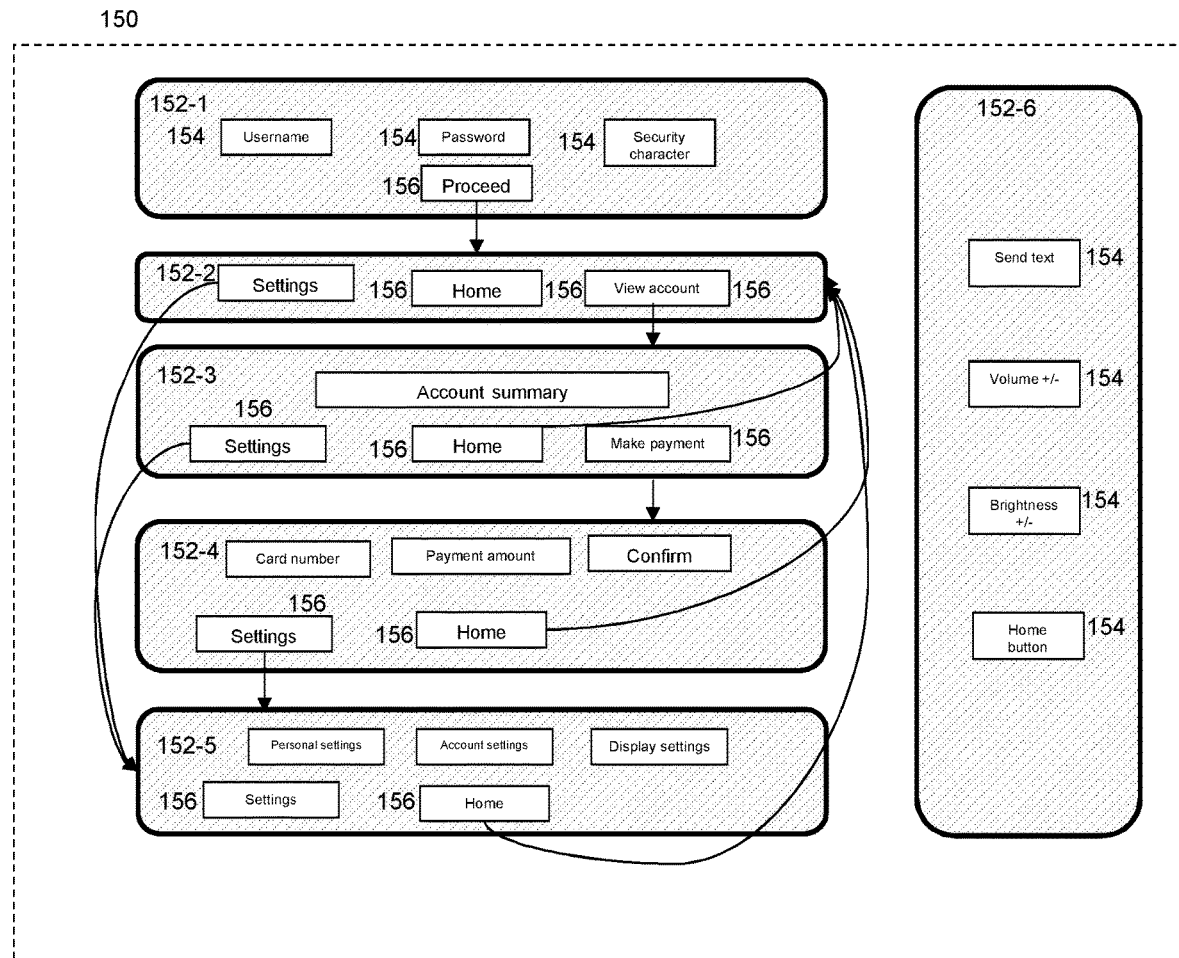
FIG. 8 shows a schematic example of a model based on the example of FIG. 6.

FIG. 8 shows a schematic high-level diagram of an exemplary real-world model 150 according to an embodiment of the present invention. The model of FIG. 8 is based on the application 50 illustrated in FIG. 6. However, this is to be taken as non-limiting and the model may be based on any suitable application to be tested.

As shown schematically, the model 150 has a plurality of model states 152-1-152-n. In this example, each model state 152-1 to 152-n corresponds to and is representative of a respective operational state 52-1-52-n of the application 50 under test as shown in FIG. 6. However, this need not be the case and other states 152 of the model may be provided which do not directly correspond to an operational state 52 of the application 50. The states of the model 150 are entirely application dependent and may be varied as appropriate. However, the states relate to specific properties of the application under test 50 or related states which may exist, for example, prior to launch of the application-under-test or after the application-under-test has been closed.

Model Actions

Each state is modelled as comprising a set of model actions 154, 156 that can be taken within that state. The model actions are representative of the actions 54, 56 that can be taken in the corresponding operational state 52 of the application under test 50.

By modelling the application under test 50 as a series of operational states 152 with corresponding available actions 154, 156, the present invention can overcome a number of disadvantages of known techniques described above.

Each state 152 of the model 152 generally has at least one action 154, 156 available in that state 152. However, this is non-limiting and may not apply to all states—for example, a log out state which may result from the selection of a "close application" action may not have any valid actions available in that state.

Execution of an action 154 in a particular operational state 152 may carry out a specific function within a particular operational state 152 and/or may cause the application 50 under test to move to a different operational state 152 having different actions or functions.

Actions 154 may be specific to a particular operational state (e.g. login details for usernames and passwords) or may comprise global actions (e.g. a "home" button or link present in every operational state and which executes the same process when selected).

Each modelled state 152 is modelled as comprising a series of actions 154, 156 that can be taken within that state. Modelled actions 154 correspond to actions 54 which relate to operations carried out on the application 50 in a particular state and modelled actions 156 correspond to actions 56 in the application 50 which transition the application 50 into another state.

Further, additional, non-application-specific actions may also be available. With reference to FIG. 8, the model 150 has a hardware-level modelled general state 152-6 which has non-application specific modelled actions 154. For example, if the application 50 is running on a smartphone or tablet, the user may be able to perform some non-application specific actions which may affect the application 50 itself. These are modelled as general actions 154.

The general actions 154 may include, in non-limiting examples, changing the volume up or down, changing the brightness, selecting the home button so as to exit/renter the application, attaching or disconnecting headphones, viewing a global drop-down or swipe-up menu, receiving or making a call etc. These actions 154, whilst not specifically actions within the application 50 itself can have an effect on the operation of the application and it may be desired to test these actions as part of an automated test. The modelling of such actions 154 cannot be done with a conventional "flow" model as commonly found in automated testing environments.

Action Attributes

Figure 9:
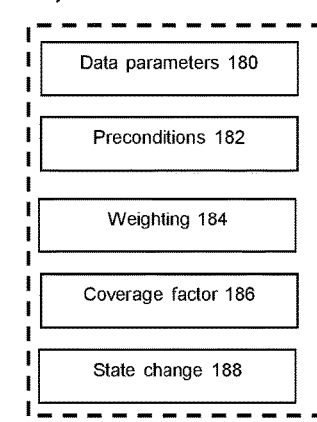
FIG. 9 shows the attributes of an action.
Figure 9:
Figure 10:
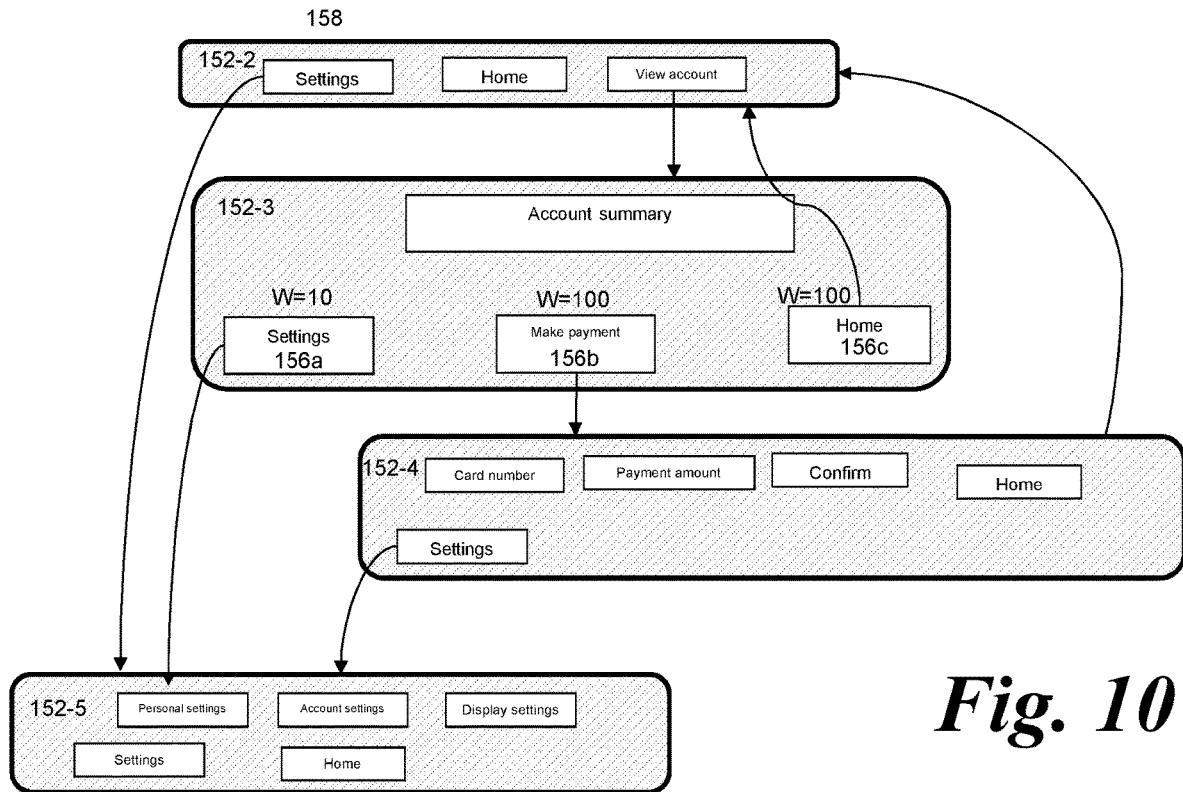
FIG. 10 shows an expanded version of FIG. 8 illustrating the transitions between actions of the model 150 of FIG. 8.

As shown in FIG. 9, each modelled action 154, 156 has a number of attributes associated therewith. A modelled action 154, 156 may also be associated with one or more test description sections 170.

A modelled action 154, 156 may comprise one or more of the following: associated data parameters 180, action preconditions 182, a weighting 184 and a coverage factor 186. The data parameters 180, action preconditions 182 and a weighting 184 may be defined by the tester. The coverage factor 186 is a parameter updated with each test run and dependent upon the results of previous test runs.

Each action 154, 156 may have a variable number of the above components as set out in Table 1 below:

TABLE 1

| Action feature | Allowable number |
| --- | --- |
| Parameters 180 | 0 or more |
| Preconditions 182 | 0 or more |
| Weighting 184 | 1 |

TABLE 1-continued

| Action feature | Allowable number |
| --- | --- |
| Coverage factor 186 | 1 |
| State changes 188 | 0 or more |
| Test description sections 170 | 0 or more |

For the purposes of this description, a distinction is made between a modelled action 154 which does not cause a change of state, a modelled action 156 which causes a change of state and a global action 154 accessible in any state.

However, it is clear from a reading of Table 1 that these distinctions result from different attributes assigned to a given action. For example, an action 154 would have 0 state change 188 attributes, whilst a modelled action 156 must have at least one state change 188 attribute.

Further, in the case of global actions 154 (accessible in any state 152), these actions 154 do not have any precondition 182 attributes associated with a particular state (i.e. they are selectable in any state 152 provided there are no action preconditions not yet met). This is described below.

Furthermore, for completeness, it is apparent from Table 1 that any given action 154, 156 may comprise any suitable number of, and type of, attributes. For example, an action 156 has a state change 188 attribute but may also have one or more parameter 180 attributes or preconditions 182. Any suitable permutation of attributes is possible within the scope of the present invention.

The attributes of the modelled actions 154, 156 will now be described in detail below.

Data Parameters

Data parameters 180 relate to a variable which can be input to the application under test 50 when the action 154, 156 is executed. The nature of the input is specified by the tester. The data parameters 180 may comprise data values to be inputted or entered into particular windows or boxes in the respective modelled state 152 of the application under test 50, for example a text entry into a dialog box.

In other words, a parameter 180 is equivalent to a "variable" in a typical programming language. Therefore, a data parameter 180 is a named unit of data that may have different specific values during the execution of the test. There are three levels of parameters 180:

1) Global parameters (parameters accessible from all actions 154, 156)
2) State parameters (parameters accessible from all actions 154, 156 within the current state 152)
3) Action parameters (parameters only accessible from within that action 154, 156)

A parameter 180 may comprise any variable; for example, a number, a date, true/false, a string, etc. The valid values for a parameter may be defined in any suitable manner. For example, a parameter 180 may be defined as either a range (e.g. 1 to 1000) or a set {1, 5, 6, 7}. By way of a non-limiting example, a parameter 180 of "username" could be defined to be {"Antony", "Jon", "Giles" } or any other character string or numerical value.

A number of operations can be performed on a parameter 180 by the model 150. These are:

1) Set parameter 180 to a specific value;
2) Set the parameter 180 to a randomly value chosen from a set defined by the tester;
3) Pass the parameter 180 to a test description section 170;
4) Take a value returned from a test description section 170 and assign it to a parameter 180; and
5) Use the parameter as part of a precondition 182 (described below).

In addition, a parameter 180 may also be used in a check, for example when a value is returned from a test description section 170 it may be checked within the model 150 to ensure that it is a specific expected value or within an expected range.

Further, whenever a value is set (randomly, to a specific value, or by a test description section) coverage information (as described later) can be collected to indicate the values that have been seen during testing.

Examples of parameter applications will be described below.

Preconditions

Action preconditions 182 specify constraints on when a particular action 154, 156 is allowed to be executed. Whilst only a subset of all actions 154, 156 are generally available in any one state 152, it may be the case that preconditions determine that only a subset of the actions 154, 156 in any one state 152 are available in that state. Whether an action 154, 156 is valid and available in any one state 152 is determined by the preconditions 182.

Two basic types of precondition may be set for a given action 154, 156: state preconditions and action preconditions 1) State Preconditions For a state precondition, an action 154, 156 may be defined as being only selectable in particular states (e.g. the action 154, 156 may only be selectable if the action's predefined state is the current state 152 of the model 150).

If no state precondition is set, the action 154, 156 is available in any state—i.e. it is a global action. An example of a global action may be the volume control example as described above.

2) Action Preconditions

Action preconditions define that an action 154, 156 may only be selectable if the action's preconditions are met. A precondition 182 is a check that a parameter 180 has a particular value (or set of values). For example a precondition 182 may be defined as "check username-has-been-entered=true". Constraints may also be imposed on directly on state changes 188 or transitions.

For example, consider state 152-1 in FIG. 8. As shown, three modelled actions 154 ("username", "password" and "security character") are provided together with an action 156 (a proceed button)

When modelled, the tester can specify preconditions 182 on action 156 "proceed". For a login screen (state 152-1), action 156 "proceed" can only be selectable once all of the ("username", "password" and "security character") fields are correctly completed. Therefore, a precondition for action 156 "proceed" would be that actions "username", "password" and "security character" are executed correctly. For username, the precondition may be "transition if username-is-valid=true". The same would apply to the other preconditions mentioned above.

More generally, preconditions 182 for an action X may be expressed as "only select action X after action Y" or "only select action X if a state variable has value Z". Therefore, preconditions of prior states of other actions 154, 156, parameters 180 or the requirement for the model 150 to be in a particular state 152 determine whether an action 154, 156 can be selected.

Weighting

The model 150 as built comprises states 152 representative of the operational states 52 of the application 50. In each state 152 one or more actions 154, 156 are possible. Some actions are transition actions 156 which cause the model 150 to transition to another state 152.

In general, most states 152 will have multiple actions 154, 156 available in that state 152. However, in the case of any application, certain actions are used more often than others. For example, in a mobile banking application, the "make transfer" action would be used much more regularly than the "help" or "settings" action. To reflect this, the "make transfer" action must be tested more thoroughly.

This is done through applying a weighting to each action. More significant or important actions are weighted more highly so that these actions are selected more often, and hence tested more thoroughly.

In other words, when the model 150 is run, there will be a particular probability of a given action 54, 56 being executed for a particular operational state 52 and this will depend on the weighting applied to each action.

Consider, for example, FIG. 9. FIG. 9 shows an expanded and reconfigured view of part of the model of FIG. 7. Consider state 152-3. In this state (which, in this example, represents the "accounts summary" operational state 52 of application 50), three actions 156*a* (settings), 156*b* (make payment), 156*c* (home) are available. All actions 156 are transition actions and, when the model 150 is run to test the application 50, will cause the application 50 to move from state 52-3 to another state 152.

A weighting 184 is assigned to each of the actions 154, 156. In other words, taking the example of FIG. 9, the probability of the model 150 selecting action 16*a*, 156*b* or 156*c* in any given test iteration is defined by a weighting 184.

The weightings 184 may be based on typical use scenarios and may be set by the tester. In this example, it may be known that a user will typically use the home and "make payment" buttons much more frequently, and the settings option less frequently or rarely.

Therefore, the weightings 184 for the actions 156*a*, 156*b* and 156*c* may be set to 10 for the settings and 100 for the home and make payment actions 156*b*, 156*c*. In other words, when the model 150 traverses the operational states 152 and reaches state 152-3 of the example, it will be ten times less likely to select the settings action 156*a* than either the home or make payment actions 156*b*, 156*c*.

Coverage Factor

The weighting approach, when taken alone, has a number of problems. Firstly, the chance of selection of a particular action in a particular state is statistically independent between test runs of the model 150. Therefore, if a high weighting is applied to a particular action, a disproportionate number of test runs may select, for example, home action 156*b* and leave the other options relatively untested. In this scenario, a number of pathways through the actions 154, 156 of the model 150 may be executed a plurality of times whilst other pathways may not be executed at all. This results in poor coverage of the application 50.

This may, at worst, force a tester to test particular test scenarios manually, leading to greater complexity and uncertainty. However, generally, when a model is run hundreds or thousands of times to test various flow paths through the actions 154, 156 of the model 150, it is not possible for a tester to ensure appropriate coverage is obtained using known weighting models.

Aspects of the present invention address these issues. In embodiments, the present invention utilises a further parameter in the form of a coverage factor 186. The coverage factor 186 for each action 154, 156 is a parameter which is changed or modified in some way in dependence upon the paths taken by previous iterations of the automated test using the model 150. In other words, the coverage factor 186 for each modelled action 154, 156 is a parameter which is modified in dependence upon previous runs of the model 150.

Thus, the model 150 of the present invention incorporates a feedback aspect which modifies the coverage factor 186 associated with each action 154, 156 depending upon how many times that action 154, 156 has been executed in previous runs of the test program.

In non-limiting embodiments, the coverage factor 186 is implemented by storing in the database 190 the number of times that any given action 154, 156 has been executed. This value of the coverage factor 186 is then used as an input to the action selection algorithm of the model 150.

Initially, in non-limiting embodiments, the coverage factor 186 for a given model action 150 is set at 0. When model actions 154 are selected and executed in the model 150, the coverage factor 186 for the model actions 154 is updated accordingly. Exemplary and non-limiting mechanisms for implementing such a coverage factor 186 will be described below.

Coverage Factor Implementations

The implementation of the coverage factor as a feedback mechanism to influence the subsequent selection of model actions based on the previous selection of model actions in a current automated test or previous automated tests may be done in a number of ways.

Coverage Implementation Example 1

In embodiments, the number of times a particular model action 154, 156 is selected during the course of one or more automated tests is logged. In this example, the coverage factor 186 for a model action 154, 156 having a single parameter 180 (multiple parameter model actions 154, 156 will be discussed below) has a value based on the number of "hits" of that model action 154, 156. The coverage factor 186 may then be described as a coverage counter for that model action 154, 156.

In this example, the coverage factor 186 of one model action 154, 156 is compared to the coverage factors 186 of any other model actions 154, 156 available to be selected in the current state 152 of the model 150.

In other words, in this non-limiting embodiment, the influence of the coverage factor 186 of a model action 154, 156 in determining the subsequent selection of that model action 154, 156 is dependent upon the relative value of the coverage factor 186 of that model action 154, 156 relative to any other model actions 154, 156 available for selection in the current model state 152.

Consider, for example, three model actions A, B and C which are each selectable in a given state 152. In a first automated test, model action A is selected. Once (or at the same time as) model action A is selected/executed, the coverage factor 186 for model action A is updated to 1 (or 100%).

Thus, later in the test run (if the model 150 when executed returns to a state 152 in which model actions A, B and C are selectable) or on a subsequent automated test run, model actions A, B and C have corresponding coverage factors 186 of A=1 (100%), B=0 (0%), C=0 (0%).

At this point, either model actions B or C are more likely to be selected than model A. Note that A is not excluded from selection because the selection of a model action 154 from a plurality of available model actions 154 is dependent upon other aspects (e.g. probabilities, weightings 184 or other random elements.

When all of model actions A, B and C have been selected, the coverage factors 186 may remain at 100% indicating that complete coverage of A, B and C have been achieved.

Coverage Example 2

As set out in example 1, the coverage factor 186 may have any reasonable target value for the number of selections (or hits). The coverage factor 186 is then defined as hits/target value, with a maximum value of 1.0, since 100% coverage is the maximum possible in this implementation.

It is also possible to define the coverage factor for a group of model actions 154, 156. This would then enable a more global view of the coverage of model actions 154, 156. for any group of model actions 154, 156, the coverage for the group is the average of the coverage of each model action 154, 156 in the group. The group coverage can be defined as set out in expression 1) below:

$$\sum_{i=1}^{i=n} \frac{\min(hits_i, \text{target})}{\text{target} * n} \quad 1)$$

Where i is the number of hits and n is the number of model actions 154, 156 in a group.

Thus, whilst the coverage of any one model action 154, 156 relative to any other selectable model action 154, 156 in that state is dependent upon the relative coverage factors, the use of the group approach enables groups of model actions 154, 156 which may be, for example, related (e.g. a set of login actions) to be allocated a coverage value.

Coverage Example 3

Examples 1 and 2 above presented a simple, non-limiting example of the coverage factor 186 in use. However, in other non-limiting embodiments, more complex implementations may be used to provide further advantages. The coverage factor 186 is being used to influence the selection of model actions 154.

Therefore, in examples, when one section of the model 150 is complete (for example, when A, B and C have all been executed as described in example 1), the coverage factor 18 may no longer be an influencing input into the selection algorithm of the model 150. This may lead, in some examples, to certain possible pathways through the model 150 being excluded.

Example 3 relates to a more complex mechanism known as "tidal" coverage. This non-limiting implementation provides, in use, a "moving target" for the coverage factor 186 which encourages test complexity.

In this example, the target value of the coverage factor 186 for each model action 154, 156 in a group of model actions 154, 156 is modified so that it is always one more than than the minimum hit count for any of the model actions 154, 156 in the group. For example, if the minimum value is 0, then the target is 1 and so on.

Consider an example where four model actions A, B, C and D are in a group. Model action A has a coverage factor 186 based on a hit count of 3, model action B a hit count of 5, model action C a hit count of 7 and model action D a hit count of 3.

Therefore, the minimum value is 3 and the target value is 4. So the coverage for the group of A, B, C and D would be: $3+4+4+\frac{3}{4}*4 = \frac{14}{16}$.

Further Coverage Variations

However, variations are possible within the scope of the present invention. A negative feedback implementation may, alternatively or additionally, be used. For example, the most executed actions 154, 156 in previous test runs may be iteratively assigned lower coverage factors 186 and/or the less executed actions 154, 156 in previous test runs may be assigned relatively higher coverage factors 186. In this arrangement, the model 150 will adaptively reconfigure during subsequent test runs such that the less well tested pathways are selected more often on subsequent test runs.

This approach ensures that, over a sufficient number of test runs, excellent coverage of an application 50 can be performed by the automated test sequences.

In the described embodiment, the coverage factor 186 is entirely independent of the weighting 184 for each action 154, 156. This has advantages in that the weighting 184 for each action 154, 156 may be determined on the basis of predicted usage patterns and is not affected by the coverage factor 186. Therefore, in the present embodiment, this relationship between actions 154, 156 is preserved whilst also providing for improved coverage through use of the coverage factor 186.

It is to be noted that the above examples are non-limiting and for exemplary purposes only. Any suitable modification to the coverage factors 186 may be applied after one or more test runs. For example, the coverage factors 186 may be modified with each test run, or may only be modified after a set number of test runs.

However, whilst a number of examples have been given above, any form of selection modification which utilises the actions selected in previous tests in some form could be used. In general, the coverage factor 186 applied to model actions 154, 156 may take the form of dependent or independent factors which are used to modify the coverage factors of each action based on some factor which has a dependence upon the number of times that action has been selected or not selected in previous test runs. As a further alternative, adequate coverage could be implemented by utilising a coverage factor 186 for an action that has a threshold value. This could be achieved, for example, by providing a coverage factor for each action, and as counter which logs the number of times each action is traversed. Then, when the counter reaches a maximum or threshold value for an action 154, 156, the model 150 is forced to select a different action 154, 156.

Further variations would be readily apparent to the skilled person. For example, the skilled person would be aware of variations which would still fall within the feedback approach of the present invention whereby a parameter related to a particular action is selected based on the results and/or path taken through the actions and states of the model in one or more previous test runs.

For example, instead of a separate coverage factor, the weightings themselves may be modified. Additionally or alternatively, particular constraints may be imposed on certain actions based on how many times those actions have been selected in previous test runs.

In addition, the tester may add additional "hints" or modifications to particular pathways. This may be useful in situations where a particular pathway would, routinely, only be accessed in a non-standard way which does not fit with a general use scenario. These empirical modifications may be used as required by the tester.

For example, an "update password" option may be automatically triggered once every month on a banking or shopping application. It is not necessary to test this functionality routinely during a large number of test cycles. However, it may be necessary to test it at least once. Therefore, the tester may introduce a command which causes the model to test a particular action or path only once every 100 test runs. The use of feedback as set out in the present invention renders such dependencies easy to implement because the model 150 has visibility of the previous paths taken by the model and other details of previous test runs, in contrast to known testing configurations.

Other examples are possible and the skilled person would readily be aware of the type and nature of constraints that the model 150 could implement to enable accurate testing of the application 50 under test.

Weightings and Coverage Factors for Intra-Action Variables

As noted above, where an action 154, 156 has multiple data parameters 180 associated therewith (i.e. in the case of input variables), a preferred mechanism is provided for inputting these variables in each action 154, 156.

Analogous to the utilisation of the coverage factors 186 to provide variation in the selection of particular actions 154, 156 with each test run (i.e. inter-action variation) to ensure adequate coverage of the actions 154, 156 and resulting pathways through the model 150, one or more coverage factors 186 could be applied to the selection of data parameters 180 within an action 154, 156.

For example, consider the case of a "login" state and, more specifically, the action "user name". There may be five different user names defined within the action "user name", e.g. user 1, user 2, user 3, user 4 and user 5. To ensure adequate coverage of these aspects, the model may select a username based a coverage factor (i.e. based on how many times a particular user name has been selected in previous tests).

Therefore, if "user 1" is selected in a first test run, the coverage of the "username" action is 20%. If "user 2" is selected in the next test run, the coverage would be 40%, and so on. By using this approach, coverage can be ensured at both inter-action and intra-action levels.

The use of intra-action coverage factors for parameters may also influence the coverage factor 186 for that model action 154, 156. Consider, for example, the example of Coverage implementation example 1 above. If model action 154, 156 above has two parameters 180, then a first selection/execution of that model action 154, 156 will select only one of the available parameters 180. As a result, the coverage factor for that model action 154, 156 may only be 50% because only one of the two permutations of parameter 180 has been selected. Therefore, if model action A and C are selected once each, model action A may have a coverage factor of 0.5 (50%) whereas model action C (with only a single parameter 180) may have a coverage factor of 100%.

Thus, in a subsequent selection from the group of A, B and C, model action B (currently unselected) will be most likely to be selected, with model action A next most likely having 50% and model action C the least likely having 100%.

A further variation of this approach is where the model action 154, 156 itself is assigned a coverage value in addition to the parameters 180. In this approach, where a model action 154, 156 has two parameters 180, selection of one parameter 180 as per the example above would result in a coverage factor of 66.6%, where out of three possible coverage values (one for the model action 154, 156 being selected at all, and one each for the two variations of parameter 180) two are selected.

Test Description Sections

Once the actions 154, 156 of the model 150 are defined, then elements or sections of a test description can be associated with each action 154, 156. A conventional test description is, in general, written manually and comprises a sequence of particular operation/validation steps to be carried out on the application 50 to be tested. A test description may comprise any suitable type of script or program which interacts and/or analyses the application-under-test 50.

An operation may be, for example, an instruction to execute a particular command, type text into a text box, click on an icon or other symbol present on the application interface in a given state. A validation may then be operable to identify that the operation has executed successfully, through identification of an "expected image" as discussed above (for image-based testing programs) or via other means.

Conventionally, a test description is prepared for an entire traversal through an application in the form of an operation/validation flow. However, this is cumbersome and unwieldy as described above.

In contrast, in the present invention, relatively small sections of test description 170 are associated with particular actions 154, 156. The use of the model 150 of the present invention enables appropriate use of sections of a test description 170 which enables the model 150 to call the appropriate sections of the test description 170 when required.

This approach has significant advantages over known arrangements. By separating out the configuration of the model 150 from the actual test script/description, a model 150 can be built quickly and easily and then associated with manually- or automatically-created test description sections which enable execution of the various operation(s) and/or validation(s) forming the relevant actions 154, 156.

This approach allows a tester to define the actions 154, 156 at different levels of granularity, depending upon the level of detail that the tester desires to be incorporated at any particular stage. For example, a single test description section may be associated with a plurality of individual actions 154, 156 that are to be treated, for the purposes of the model, as a single deterministic process. This has numerous benefits as will be described below.

Consider, for example, the login action of state 152-1. A login action may itself require several actions to complete. For example, a user may be required to enter a username, password, select a security character from a list of security characters and select "proceed".

To test this large number of actions 154, 156 completely would require each action to be modelled independently and the various permutations tested to ensure there are no errors. For example, whilst a "logical" flow may be to enter all details before selecting "proceed", use scenarios outside of this flow may need to be tested. For example, the use scenario whereby proceed is selected before all data fields have been filled, or where a user selects a "back" action and forward action before selecting "proceed". It is to be noted that these are merely examples and are not to be taken as limiting.

This testing can be done by implementing each individual action 154, 156 individually in the model 150 so as to enable this functionality to be rigorously tested. Nevertheless, it may be that, within the testing framework of a particular application, the tester is not concerned with the login screen and wishes to test the action of, for example, the homepage or settings page. Conventionally, the tester would still need to model all features of the login page to ensure that a full model can operate correctly. This is cumbersome and time consuming.

Figure 11:
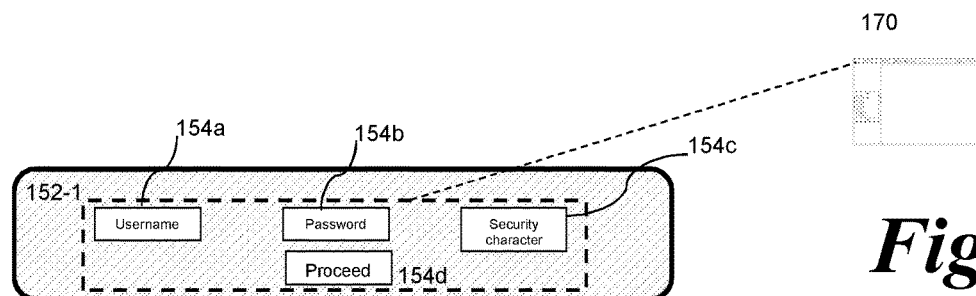
FIG. 11 shows an example of a model where a test description section comprises a plurality of model actions.
Figure 12:
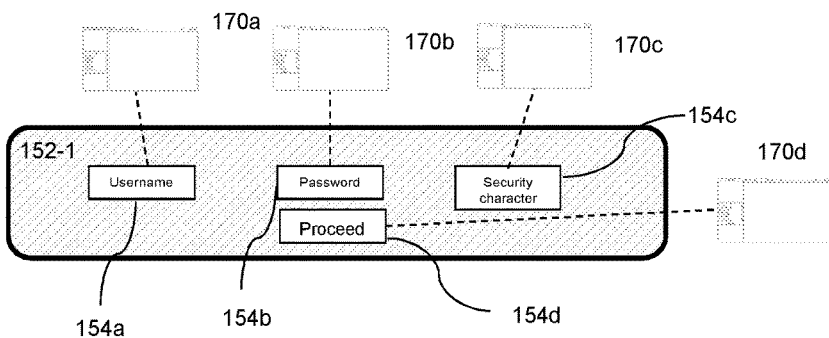
FIG. 12 shows the same example as FIG. 11 but where a single test description section is assigned to each action individually.

The present invention provides a unique solution to this. FIGS. 11 and 12 show examples of the login screen. FIG. 11 shows modelled actions 154a (username), 154b (password), 154c (security character) and 156 (transition action "proceed" which transitions to state 152-2).

As shown in FIG. 11, modelled actions 154a (username), 154b (password), 154c (security character) and 156 (transition action "proceed") are all associated with a single test description section 170. This test description section 170 defines a single, linear flow through the modelled actions 154a, 154b, 154c and 156. Therefore, when called by the model 150, test description section 170 is run and executes a single, predetermined sequence of the actions 154a, 154b, 154c and 156 (which, themselves may comprise one or more operation/validation commands) to complete the login process on state 152-1.

The tester may then reuse particular test description sections 170 for similar actions 154, 156.

This approach means that the "login" page cannot be fully use tested but this may not be important for a large number of testing scenarios. For example, if an update to an application is required to be tested, the "login" state may be identical to the previous version of the application and so does not need to be tested. By utilising the method of the present invention, the tester can rapidly build a model which can focus on the aspects of the application 50 which need to be tested without utilising time and resources to re-test an aspect of the application which does not require it.

If, at a later time, it is determined that the actions 154, 156 on the login page needs to be tested in detail, the modelled actions 154, 156 can be modelled independently as described below.

FIG. 12 shows an alternative scenario where a tester wishes to test the functionality of the login page more thoroughly.

In this example, each model action 154a, 154b, 154c, 156 is assigned a respective test description section 170a, 170b, 170c, 170d. Therefore, the login state 152-1 can be tested more thoroughly within the model 150, with the model 150 being operable to call individual actions 154a, 154b, 154c, 156 in any specific order or combination to test the login process.

As a result, the method of the present invention enables a tester to select the level of granularity for each state 152 or action 154, 156 of an application 50, so that rapid progress on the testing of the application 50 can be made without the burden and complexity of a full model or the limitations of a simple flow process.

The model of the present invention, therefore, enables actions to be defined for each state of the application at different levels of abstraction. Multiple actions for a state of an application may be assigned to a single test description section 170 as a single execution which executes a pre-designated path through those actions. Alternatively, the multiple actions may be defined individually, thereby enabling testing to occur within the action group. Finally, an action 154, 156 may be associated with multiple test description sections 170 if required.

The use of such a modular structure provides numerous advantages. For example, a tester can choose whether to implement greater functionality in the model 150 itself (e.g. in the form of model actions 154, 156) or in the relevant test description sections 170.

Further, the ability to associate one or more test description sections 170 with one or more model actions 154, 156 has significant advantages. For example, consider a model action 154 which comprises two operations on the SUT—enter text into a text box and select a "proceed" icon. If the "proceed" icon is generic to the SUT, the test description section 170 could be written for this generic action and associated with multiple model actions 154. 156. Thus, the tester need only write a single test description section 170 for this operation which can be associated with multiple model actions 154, 156 even if those model actions include further operations.

A further variation of this approach is where the model action 154, 156 itself is assigned a coverage value in addition to the parameters 180. In this approach, where a model action 154, 156 has two parameters 180, selection of one parameter 180 as per the example above would result in a coverage factor of 66.6%, where out of three possible coverage values (one for the model action 154, 156 being selected at all, and one each for the two variations of parameter 180) two are selected.

Example of Operation

An example of the use of the action attributes will be described below with reference to FIG. 8.

Consider a parameter 180 "username-entered" which may be true or false and indicates whether any text has been written into a 'username' text box on a login state 152-1. This would, therefore, comprise a parameter 180 within the "login" state 152-1. When the model 150 is executed, the parameter 180 would initially be set to "false" because the username field is initially empty. However, when the action 154 "username" is selected, the relevant test description section 170 will be executed and the "username" text box will be filled. The parameter 180 "username entered" would then be set to "true".

The "username" parameter 180 could then be defined as a precondition 182 for the action 156 "proceed". In other words, the action 156 "proceed" is only allowed if the "username" parameter 180 is "true".

By way of a further example, consider the homepage of a news application. The application is displaying ten stories and the test program is to pick a random news story. To define this in the model 150, an action-level parameter 180 "story" may be set to a random value between 1 and 10. When the relevant action 154, 156 is selected, the relevant test description section 170 will be executed and the respective story selected.

Method of Creating a Test Description

Figure 13:
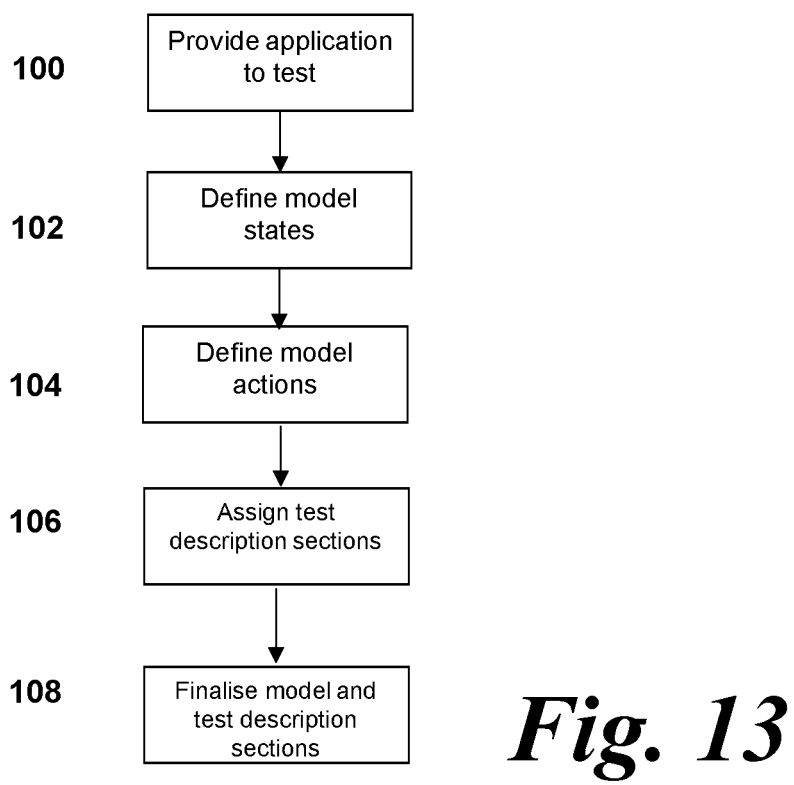
FIG. 13 shows a flow chart in accordance with an embodiment of the present invention.

A method for creating an automated computer test description according to a first embodiment of the present invention will now be described with reference to FIG. 13. FIG. 13 is a flow chart showing the process for creating an automated test description. It is to be noted that the example of FIG. 13 is exemplary and the steps of the method may be executed in any suitable order as would be apparent to the skilled person.

Step 100: Define Application to Test

In step 100, an application 50 to be tested is provided. As set out above, an application to be tested may be in the form of application software provided to the tester, or a technical specification for an application. Alternatively or additionally, the application 50 may comprise a plurality of interacting software elements, and/or may comprise an entire computing system such as a mobile phone, desktop computer or specialist hardware. Non-limiting examples of specialist hardware may include: an aircraft or drone flight control system; in-vehicle software/hardware functions; or specialist computing systems.

Once the application has been provided, the method proceeds to step 102.

Step 102: Define Model States

In step 102, the model 150 is provided and the states of the model are defined. The states 152 of the model 150 are defined based on the operational states 52 of the application 50. However, this need not be explicitly the case and other model states 152 may be defined which are necessary to operation of the model 150 but which do not directly correspond to a state of the application 50.

Once the states are defined, the method progresses to step 104.

Step 104: Define Model Actions

At step 104, the model actions 154, 156 are defined.

Model actions 154, 156 are defined in relation to the actions 54, 56 of the application 50. The modelled actions 154, 156 are then assigned attributes, namely appropriate numbers of: associated data parameters 180, action preconditions 182, a weighting 184 and a coverage factor 186 as described above. The data parameters 180, action preconditions 182 and a weighting 184 may be defined by the tester. The coverage factor 186 is a parameter updated with each test run and dependent upon the results of previous test runs.

Once the actions 154, 156 are determined in step 104, the method proceeds to step 106.

Step 106: Assign Test Description Sections

Once the actions 154, 156 and associated attributes have been defined in step 104, one or more test description sections 170 are assigned to each action 154, 156. Alternatively, a single test description section 170 may be assigned to multiple actions 154, 156 such that the multiple actions 154, 156 are executed in a deterministic manner.

Once the test description sections 170 have been assigned to the modelled actions 154, 156 as required, the method proceeds to step 108.

Step 108: Finalise Model and Test Description Sections

At step 108, the model 150 is finalised and is ready for execution by an appropriate testing tool.

As will be appreciated by the skilled person, the above steps may be carried out in sequence for an entire model. However, alternatively or additionally, the steps may be carried out for individual states. For example, a workflow to create the model described above may comprise:

1. Define state A (step 102).
2. Define the actions for state A (step 104).
3. Assign test description sections 170 to one or more actions (step 106).
4. Define state B (step 102).
5. Define the actions for state B (step 104).
6. Update the actions for state A (step 104).

Method for Performing an Automated Test

Figure 14:
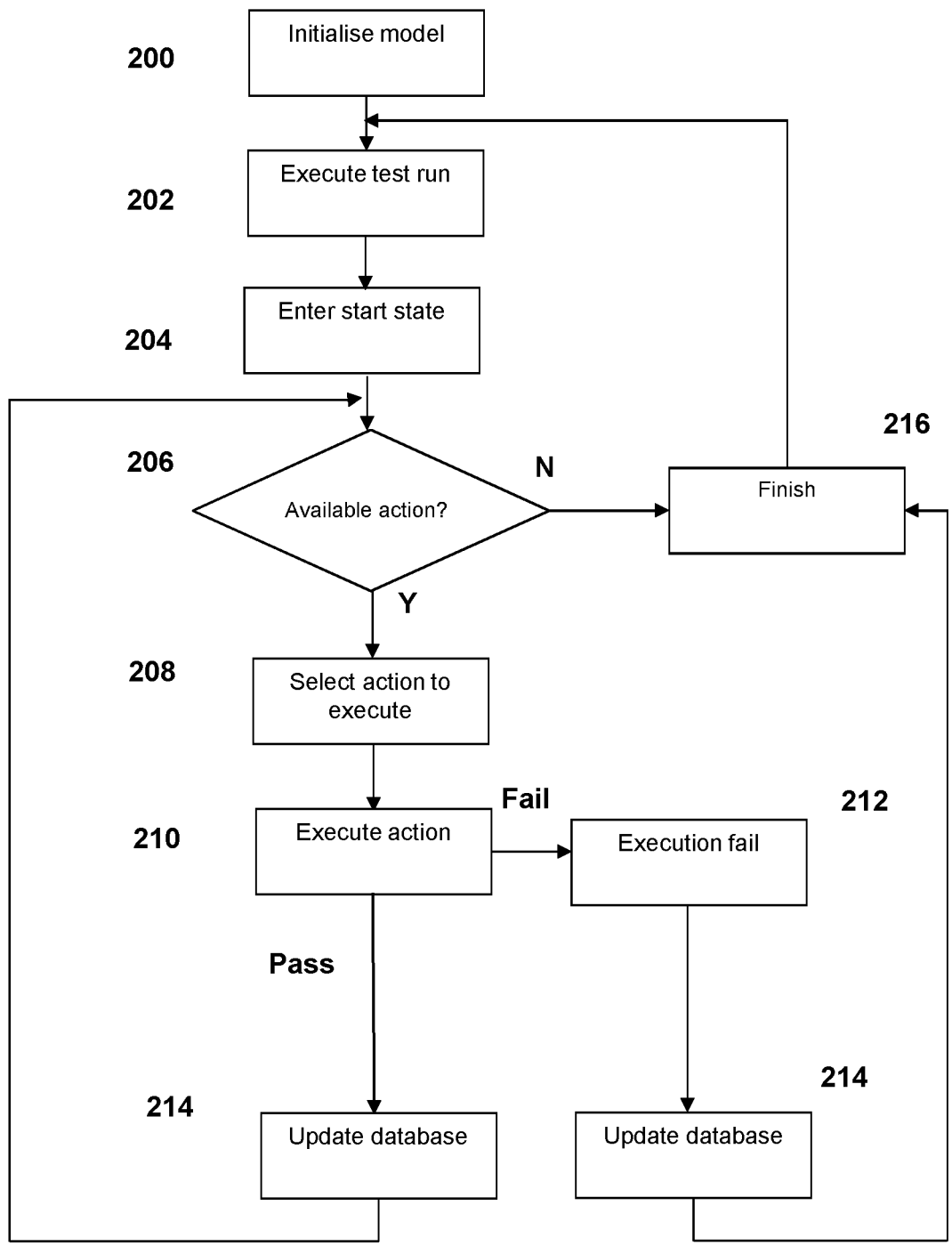
FIG. 14 illustrates a flow chart of another aspect of the present invention.

A method for performing an automated test using the model 150 will now be described with reference to FIG. 14.

The method is configured to cause a test computer system 6 to communicate with a system under test comprising one or more computer programs (such as application 50) executed on a computer device. FIG. 14 shows a flow chart of this method.

Step 200: Initialise Model

Once the model 150 has been built in steps 100 to 110, the application 50 under test can then be tested using an appropriate testing tool. The model 150 is configured such that, when executed, it will carry out various actions corresponding to specific operational states 52 of the application 50.

The method proceeds to step 202.

Step 202: Execute Test Run

At step 202, the model is executed using a testing tool.

The test tool will traverse the model 150 by executing one or more available actions 154, 156. The test run proceeds as set out in the following steps 202-216, starting with step 204.

Step 204: Enter Start State

When the model 150 is constructed, a state 152 is defined as a "start" state. Whenever a test run is executed, the model 152 will start a test run in the start state.

The model 150 then proceeds to step 206.

Step 206: Available Action?

At step 206, it is determined whether there are any actions 154, 156 to select in the current state 152. An action 154, 156 can only be selected if it is a) an action 154, 156 available in the current state 152 and b) that all preconditions 182 for the action 154, 156 have been met as required (i.e. the action 154, 156 is a valid action for that state 152).

If there are no valid actions for the current state, then the method proceeds to step 216. If there are valid actions for the current state, the method proceeds to step 208.

Step 208: Select Action to Execute

At step 208, an action 154, 156 is selected for execution. If there is a single valid action 154, 156 available in the current state, then that action is executed.

However, if there is a plurality of valid actions 154, 156 available in any one state 152, the action 154, 156 is selected based on an algorithm comprising the weighting 184 and coverage factors 186. In other words, the action 154, 156 is selected from the pool of available actions using an algorithm based on the current "coverage" of each available action 154, 156 (i.e. how many times this action and its parameters have already been used in this test execution and potentially a selected subset of previous test executions), the weight 184 of the available actions (i.e. it's relative importance as defined by the tester in the model) and, optionally, other random elements provided by the tester.

Once an action has been selected, the method proceeds to step 210.

Step 210: Execute Action

At step 210, the selected action 154, 156 is executed. When an action 154, 156 is selected, the relevant section(s) of test description 170 associated with that action 154, 156 is/are executed.

The relevant test description section 170 comprises a series of action/validation commands to test the response of the application 50 under test. This may include, for example, selection of a text box and the entering of a particular text string.

As described above, the test description section 170 may relate to one or more actions 154, 156. Further, a single action 154, 156 may comprise a plurality of data parameters 180, from which a single data parameter 180 is to be selected for execution. The weighting and coverage factors may be utilised here to select one of the data parameters 180 for execution.

If an action 156 is executed that causes a change of state, then a transition to a new state 152 occurs. If an action 154 is executed, there is no change of state.

If the test description section 170 selected in step 210 executes correctly, then the method proceeds to step 214. If the test description section 170 selected in step 210 returns an error, then the method proceeds to step 212.

Step 212: Execution Fail

At step 212, the execution has failed and the test run stops. The method proceeds to step 214 where the database is updated and then to step 216.

Step 214: Update Database

At step 214, a database is updated with the results of the action execution. This includes whether the execution of the test description section 170 was successful or failed. In addition, the action 154, 156 which was selected in step 208 and executed in step 210 is logged in the database.

Any attributes of the executed action 154, 156 (or related actions 154, 156) are also updated. For example, any parameters 180 of the action 154, 156 may be updated (e.g. from "false" to "true") and any associated constraints 182 may be correspondingly modified or updated.

As described above, the model 150 of the present invention incorporates a feedback parameter which modifies the coverage factor for each action 154, 156 depending upon which action 154, 156 was executed in step 210. The coverage factor 186 for the selected action 154, 156 and/or for non-selected actions 154, 156 is then modified and an updated coverage factor 186 stored in the database. This approach ensures that, over a sufficient number of test runs, excellent coverage of an application 50 can be performed by the automated test sequences.

The coverage factor for any intra-action data parameters 180 (i.e. coverage of available variables within actions 154, 156) is also updated in this step.

The logging of the pathway of selected actions 154, 156 taken through the model 150 in any given test is also critical in application debugging. As for any test scenario, it is necessary to recreate that particular test run identically to debug the application 50 correctly. Therefore, by maintaining a record of the actions executed in a test run, together with the particular weights, coverage and constraints applied to those actions, then the "path" of selected actions can simply be repeated deterministically to debug the failed application 50.

The method then proceeds back to step 206 for execution of further actions or, if step 212 has been executed (i.e. test run fail), then the method proceeds to step 216.

Step 216: Finish

If no further actions are available in a given state, the test run finishes. The method may then proceed back to step 202 for further test run(s).

It is to be noted that the above method represents an exemplary embodiment of the present invention and variations would be apparent to the skilled person. For example, whilst step 214 is described as occurring after step 212, this may not be the case. Step 214 may occur at any suitable point in a test run cycle.

Further variations to the above method are possible. Whilst the above method may execute test description sections 170 associated with each selected action 154, 156 in turn (and update the database 190) in an iterative sequence, variations could be carried out within the scope of the present invention.

For example, the pathway through each selected action 154, 156 in a given test run could be determined for the whole test run. Then the test description sections 170 associated with the selected actions 154, 156 could then be combined and run in a single deterministic sequence. The process would repeat for further test runs.

The methods as described herein may be executed on various different computer systems or testing environments as would be understood by the skilled person. For example, the model 150 and test data may be stored upon an external memory/storage device that is remote from the test computer system. The external device may be a central server or other computer system with access to one or more communication devices such that one or multiple test computer systems can send or retrieve data to/from the server.

The server may operate one or more databases or other information handling systems on one or more memory devices. The databases may store multiple models or databases. One database, or a part of one or more databases, may be available to all test computer systems or a set of one or more test computer systems to enable data sharing between models.

The methods described herein may be embodied in one or more pieces of software. The software is preferably held or otherwise encoded upon a memory device such as, but not limited to, any one or more of, a hard disk drive, RAM, ROM, solid state memory or other suitable memory device or component configured to software. The methods may be realised by executing/running the software. Additionally or alternatively, the methods may be hardware encoded.

The method encoded in software or hardware is preferably executed using one or more processors. The memory and/or hardware and/or processors are preferably comprised as, at least part of, one or more servers and/or other suitable computing systems.

Variations will be apparent to the skilled person. For example, the feedback element of the model 150 may be implemented in a conventional test description without use of a model.

Furthermore, the model 150 may be implemented without feedback elements and, in embodiments, may utilise the action group approach without modifying the various weightings of state changes based on the results of previous tests.

The invention claimed is:

1. A method for generating an automated test configured, when executed, to test a system under test comprising one or more computer programs being executed on one or more computer devices, the method comprising the steps of:
  a) defining a model of the system under test, the system under test comprising a plurality of operational states, at least one of the operational states having one or more executable actions associated therewith operable to execute predetermined operations and/or transition the system under test between operational states, the model comprising a plurality of model states, wherein at least some of the model states are representative of the operational states of the system under test;
  b) assigning one or more selectable model actions to one or more of the model states, each model action being available to be selected by default within the respective one or more model states and being representative of one or more executable actions on the system under test;
  c) assigning one or more preconditions to one or more of the model actions, wherein any model action having one or more preconditions assigned thereto cannot be selected unless any preconditions assigned thereto are satisfied;
  d) automatically selecting, using the model, a sequence of the model actions that are available to be selected because the preconditions defined for the model are satisfied or because the model action lacks preconditions and is selectable by default to define an automated test;

e) generating, from the selected sequence of model actions, an automated test for execution on the system under test by a test program;

f) executing the automated test and tracking hit counts for at least some of the model actions, the hit counts each being indicative of a number of times a model action was selected in a first iteration of the automated test; and g) determining a group coverage factor for a group of model actions using the hit counts, a target hit count for each of the model actions in the group and a number of model actions in the group and selecting, using the group coverage factor, model actions to be executed during a second iteration of the automated test.

2. The method according to claim 1, wherein step d) further comprises:
d)(1) selecting an available model action;
d)(2) updating any preconditions modified by the selection of the available model action; and
d)(3) repeating steps d)(1) and d)(2) to define a sequence of selected model actions.

3. The method according to claim 2, wherein, prior to step d)(1), the method comprises:
defining an initial state of the model.

4. The method according to claim 1, wherein one or more model actions are operable, when selected, to cause the model to transition from one model state to another model state.

5. The method according to claim 1, wherein step d) further comprises:
d)(1) assigning state preconditions to one or more model actions, wherein the state preconditions specify that a respective model action is only selectable when the model is in the one or more predefined model states.

6. The method according to claim 5, wherein one or more model actions comprise state preconditions specifying a single predefined model state such that the respective model actions are only available for selection if the predefined model state is the current model state.

7. The method according to claim 5, wherein if no state preconditions are defined for a respective model action, the model action is available to be selected in any model state.

8. The method according to claim 1, wherein step d) further comprises:
d)(1) assigning, for one or more model actions, action preconditions which must be met in order for the respective model action to be available for selection.

9. The method according to claim 8, wherein the action preconditions comprise the previous selection of one or more model actions and/or values of one or more parameters.

10. The method according to claim 1, wherein one or more model actions comprise at least one data parameter, wherein the or each data parameter comprises a variable to be input to an executable action of the system under test.

11. The method according to claim 10, wherein a data parameter may comprise one or more of the following: one or more numerical value; a numerical range; a set; a character string; or a true/false variable.

12. The method according to claim 1, wherein determining the group coverage factor includes determining the group coverage factor using the following expression:

$$\text{group coverage factor} = \sum_{i=1}^{n} \frac{(hits_i, \text{target})}{\text{target} * n}$$

where $hits_i$ is the hit count for the $i^{th}$ model action in the group, target is the target hit count for each of the model actions in the group, and n is the number of model actions in the group.

13. The method according to claim 1, wherein the preconditions for one or more model actions are predefined by a user.

14. The method according to claim 1, wherein executing the automated test is carried out after each selection of a model action in step d) such that executing the automated test comprises executing one or more operations associated with a selected model action on the system under test prior to selection of a subsequent action in step d).

15. The method according to claim 1, wherein step m) executing the automated test comprises executing the sequence of operations on the system under test after all model actions in the sequence have been selected in step d).

16. A non-transitory computer readable medium comprising instructions configured when executed to perform the method of generating an automated test configured, when executed, to test a system under test comprising one or more computer programs being executed on one or more computer devices, the method comprising the steps of:

a) defining a model of the system under test, the system under test comprising a plurality of operational states, at least one of the operational states having one or more executable actions associated therewith operable to execute predetermined operations and/or transition the system under test between operational states, the model comprising a plurality of model states, wherein at least some of the model states are representative of the operational states of the system under test;

b) assigning one or more selectable model actions to one or more of the model states, each model action being available to be selected by default within the respective one or more model states and being representative of one or more executable actions on the system under test;

c) assigning one or more preconditions to one or more of the model actions, wherein any model action having one or more preconditions assigned thereto cannot be selected unless any preconditions assigned thereto are satisfied;

d) automatically selecting, using the model, a sequence of the model actions that are available to be selected because the preconditions defined for the model are satisfied or because the model action lacks preconditions and is selectable by default to define an automated test;

e) generating, from the selected sequence of model actions, an automated test for execution on the system under test by a test program;

f) executing the automated test and tracking hit counts for at least some of the model actions, the hit counts each being indicative of a number of times a model action was selected in a first iteration of the automated test; and g) determining a group coverage factor for a group of model actions using the hit counts, a target hit count for each of the model actions in the group and a number of model actions in the group and selecting, using the group coverage factor, model actions to be executed during a second iteration of the automated test.

17. A computing apparatus for generating an automated test configured, when executed, to test a system under test comprising one or more computer programs being executed on one or more computer devices, the system under test comprising a plurality of operational states, at least one operational state having one or more executable actions associated therewith operable to execute predetermined operations and/or transition the system under test between operational states, the computing apparatus comprising:
at least one hardware processor being configured to:
a) define a model of the system under test, the system under test comprising a plurality of operational states, at least one of the operational states having one or more executable actions associated therewith operable to execute predetermined operations and/or transition the system under test between operational states, the model comprising a plurality of model states, wherein at least some of the model states are representative of the operational states of the system under test;
b) assign one or more selectable model actions to one or more of the model states, each model action being available to be selected by default within the respective one or more model states and being representative of one or more executable actions on the system under test;
c) assign one or more preconditions to one or more of the model actions, wherein any model action having one or more preconditions assigned thereto cannot be selected unless any preconditions assigned thereto are satisfied;
d) automatically select, using the model, a sequence of the model actions that are available to be selected because the preconditions defined for the model are satisfied or because the model action lacks preconditions and is selectable by default to define an automated test;
e) generate, from the selected sequence of model actions, an automated test for execution on the system under test by a test program;
f) execute the automated test and track hit counts for at least some of the model actions, the hit counts each being indicative of a number of times a model action was selected in a first iteration of the automated test; and
g) determine a group coverage factor for a group of model actions using the hit counts, a target hit count for each of the model actions in the group and a number of model actions in the group and select, using the group coverage factor, model actions to be executed during a second iteration of the automated test.

18. A computing apparatus operable to test a system under test comprising one or more computer programs being executed on one or more computer devices, the computing apparatus comprising:
at least one hardware processor being configured to:
a) utilise a model of the system under test, the system under test comprising a plurality of operational states, at least one of the operational states having one or more executable actions associated therewith operable to execute predetermined operations and/or transition the system under test between operational states, the model comprising a plurality of model states, wherein at least some of the model states are representative of the operational states of the system under test;
b) select a sequence of selectable model actions to generate an automated test, each model action being assigned to one or more of the model states, being available to be selected by default within the respective one or more model states and being representative of one or more executable actions on the system under test, wherein one or more preconditions are assigned to one or more model actions, wherein any model action having one or more preconditions assigned thereto cannot be selected unless any preconditions assigned thereto are satisfied, wherein the at least one processor is configured to automatically select the sequence of available model actions that are available to be selected because the preconditions defined for the model are satisfied or because the model action lacks preconditions and is selectable by default;
c) execute the automated test on the system under test using a test program and track hit counts for at least some of the model actions, the hit counts each being indicative of a number of times a model action was selected in a first iteration of the automated test; and
d) determine a group coverage factor for a group of model actions using the hit counts, a target hit count for each of the model actions in the group and a number of model actions in the group and select, using the group coverage factor, model actions to be executed during a second iteration of the automated test.

* * * * *

UNITED STATES PATENT AND TRADEMARK OFFICE
CERTIFICATE OF CORRECTION

| | |
|---|---|
| PATENT NO. | : 11,507,494 B2 |
| APPLICATION NO. | : 17/082786 |
| DATED | : November 22, 2022 |
| INVENTOR(S) | : Antony Edwards et al. |

It is certified that error appears in the above-identified patent and that said Letters Patent is hereby corrected as shown below:

In the Claims

In Column 32, Line 1, in Claim 12, delete "hits;" and insert -- $hits_i$ --.

In Column 32, Line 14, in Claim 15, delete "wherein step m)" and insert -- wherein --.

Signed and Sealed this
Fourteenth Day of February, 2023

*Katherine Kelly Vidal*

Katherine Kelly Vidal
*Director of the United States Patent and Trademark Office*